United States Patent
Peterson et al.

(10) Patent No.: US 9,547,697 B2
(45) Date of Patent: Jan. 17, 2017

(54) AGGREGATING INTERACTIONS FOR CONTENT ITEMS

(71) Applicant: Google Inc., Mountain View, CA (US)

(72) Inventors: Dan Peterson, San Francisco, CA (US); Yonatan Zunger, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 125 days.

(21) Appl. No.: 13/831,202

(22) Filed: Mar. 14, 2013

(65) Prior Publication Data
US 2016/0140185 A1    May 19, 2016

Related U.S. Application Data

(60) Provisional application No. 61/745,179, filed on Dec. 21, 2012.

(51) Int. Cl.
   *G06F 17/30* (2006.01)
   *H04L 12/58* (2006.01)
   *G06Q 50/10* (2012.01)

(52) U.S. Cl.
   CPC ... *G06F 17/30554* (2013.01); *G06F 17/30533* (2013.01); *G06F 17/30867* (2013.01); *G06Q 50/10* (2013.01); *H04L 51/24* (2013.01)

(58) Field of Classification Search
   CPC ............. G06F 17/30533; G06F 17/30014; G06F 17/30876; G06F 17/30554; G06F 17/30867; G06Q 50/10; H04L 51/24
   USPC ......................................................... 707/722
   See application file for complete search history.

(56) References Cited

U.S. PATENT DOCUMENTS

| | | | | |
|---|---|---|---|---|
| 5,724,567 A | * | 3/1998 | Rose et al. | 707/999.002 |
| 7,117,254 B2 | * | 10/2006 | Lunt et al. | 709/218 |
| 7,669,123 B2 | * | 2/2010 | Zuckerberg et al. | 715/273 |
| 7,945,653 B2 | * | 5/2011 | Zuckerberg et al. | 709/223 |
| 8,150,844 B2 | * | 4/2012 | Redstone et al. | 707/724 |
| 8,306,922 B1 | * | 11/2012 | Kunal | G06Q 30/02 705/319 |
| 8,527,496 B2 | * | 9/2013 | Wable et al. | 707/711 |

(Continued)

FOREIGN PATENT DOCUMENTS

WO    2011/019296 A1    2/2011

OTHER PUBLICATIONS

Chin, Alvin, et al., "Finding Evidence of Community from Blogging Co-citations: A Social Network Analytic Approach", Proc. of the 3rd IADIS International Conf. of Web Based Communities, © 2006, pp. 191-200.*

(Continued)

*Primary Examiner* — Robert Stevens
(74) *Attorney, Agent, or Firm* — Lowenstein Sandler LLP

(57) ABSTRACT

In one aspect, a method is provided, including the following method operations: receiving a request to generate a first post data item for display at a first location, the first post data item including a reference to a content item located at a second location; determining, based on the reference to the content item, a content identifier associated with the content item; associating the content identifier with the post data item; retrieving one or more post data items based on the content identifier and displaying the one or more post data items at the second location, the one or more post data items including the first post data item.

24 Claims, 19 Drawing Sheets

(56) References Cited

U.S. PATENT DOCUMENTS

| | | | |
|---|---|---|---|
| 8,880,640 B2* | 11/2014 | Graham et al. | 709/217 |
| 2005/0198305 A1* | 9/2005 | Pezaris et al. | 709/227 |
| 2005/0203801 A1* | 9/2005 | Morgenstern et al. | 705/14 |
| 2007/0271502 A1 | 11/2007 | Bedi et al. | |
| 2008/0134054 A1* | 6/2008 | Clark et al. | 715/753 |
| 2008/0250327 A1 | 10/2008 | Li et al. | |
| 2009/0043814 A1 | 2/2009 | Faris et al. | |
| 2009/0144392 A1* | 6/2009 | Wang et al. | 709/217 |
| 2009/0324022 A1 | 12/2009 | Sangberg et al. | |
| 2010/0119053 A1 | 5/2010 | Goeldi | |
| 2010/0132049 A1* | 5/2010 | Vernal et al. | 726/27 |
| 2011/0004692 A1* | 1/2011 | Occhino et al. | 709/228 |
| 2011/0004831 A1* | 1/2011 | Steinberg et al. | 715/753 |
| 2011/0040657 A1* | 2/2011 | Roswell | 705/27.1 |
| 2011/0040787 A1 | 2/2011 | Cierniak et al. | |
| 2011/0191406 A1 | 8/2011 | Plunkett et al. | |
| 2011/0196855 A1* | 8/2011 | Wable et al. | 707/711 |
| 2012/0005224 A1 | 1/2012 | Ahrens et al. | |
| 2012/0110096 A1 | 5/2012 | Smarr et al. | |
| 2012/0110464 A1 | 5/2012 | Chen et al. | |
| 2012/0150971 A1 | 6/2012 | Bahrainwala et al. | |
| 2012/0151322 A1* | 6/2012 | Lindsay et al. | 715/234 |
| 2012/0151383 A1 | 6/2012 | Kazan | |
| 2012/0173625 A1* | 7/2012 | Berger | 709/204 |
| 2012/0284614 A1* | 11/2012 | Zuckerberg et al. | 715/234 |
| 2012/0284649 A1 | 11/2012 | Levy | |
| 2012/0304117 A1* | 11/2012 | Donahue et al. | 715/808 |
| 2013/0031487 A1* | 1/2013 | Olsen et al. | 715/751 |
| 2013/0055056 A1 | 2/2013 | Sabur | |
| 2013/0066711 A1* | 3/2013 | Liyanage et al. | 705/14.43 |
| 2013/0159462 A1 | 6/2013 | Saiki et al. | |
| 2013/0246521 A1* | 9/2013 | Schacht et al. | 709/204 |
| 2013/0268591 A1* | 10/2013 | Chen et al. | 709/204 |
| 2013/0332523 A1* | 12/2013 | Luu | 709/204 |
| 2014/0025735 A1* | 1/2014 | Garcia-Martinez | G06Q 30/0251 709/204 |
| 2014/0025737 A1* | 1/2014 | Kruglick | H04L 67/22 709/204 |
| 2014/0059126 A1 | 2/2014 | Klemm et al. | |
| 2014/0074984 A1* | 3/2014 | Frazier et al. | 709/217 |
| 2014/0095509 A1* | 4/2014 | Patton | 707/740 |
| 2014/0136946 A1* | 5/2014 | Matas | 715/234 |
| 2014/0136968 A1* | 5/2014 | Matas et al. | 715/269 |
| 2014/0136995 A1* | 5/2014 | Matas | 715/753 |
| 2014/0137010 A1* | 5/2014 | Matas et al. | 715/764 |
| 2014/0137012 A1* | 5/2014 | Matas | 715/764 |
| 2014/0137013 A1* | 5/2014 | Matas | 715/764 |
| 2014/0137026 A1* | 5/2014 | Matas | 715/780 |
| 2014/0137043 A1* | 5/2014 | Matas | 715/835 |
| 2014/0137046 A1* | 5/2014 | Matas | 715/838 |
| 2014/0149215 A1* | 5/2014 | Rajaram | G06F 17/30616 705/14.54 |
| 2014/0149884 A1* | 5/2014 | Flynn et al. | 715/752 |
| 2014/0172995 A1 | 6/2014 | Deeter et al. | |
| 2014/0172996 A1 | 6/2014 | Deeter et al. | |
| 2014/0189524 A1* | 7/2014 | Murarka et al. | 715/744 |
| 2014/0258410 A1* | 9/2014 | Sittig et al. | 709/204 |

OTHER PUBLICATIONS

Hecht, Brent, et al., "SearchBuddies: Bringing Search Engines into the Conversation", The Sixth Int'l AAAI Conf on Weblogs and Social Media, Dublin, Ireland, Jun. 4-7, 2012, pp. 138-145.*

Jahid, Sonia, et al., "Decent: A Decentralized Architecture for Enforcing Privacy in Online Social Networks", Fourth Int'l Workshop on SECurity and SOCial Networking, Lugano, Switzerland, Mar. 19, 2012, pp. 326-332.*

Lerman, Kristina, et al., "Personalizing Image Search Results on Flickr", Intelligent Information Personalization, AAAI, © 2007, pp. 65-75.*

Munson, Sean A., et al., "Happier Together: Integrating a Wellness Application into a Social Network Site", Persuasive 2010, LNCS 6137, Springer-Verlag, Berlin, Germany, © 2010, pp. 27-39.*

Pennacchiotti, Marco, et al., "Investigating Topic Models for Social Media User Recommendation", WWW 2011, Hyderabad, India, Mar. 28-Apr. 1, 2011, pp. 101-102.*

Ugander, Johan, et al., "The Anatomy of the Facebook Social Graph", arXiv:1111.4503v1, Nov. 18, 2011, 17 pages.*

Wittie, Mike P., et al., "Exploiting Locality of Interest in Online Social Networks", ACM CoNEXT 2010, Philadelphia, PA, Nov. 30-Dec. 3, 2010, Article No. 25, pp. 1-12.*

Yamaguchi, Yuto, et al., "TURank: Twitter User Ranking Based on User-Tweet Graph Analysis", WISE 2010, LNCS 6488, Springer-Verlag, Berlin, Germany, © 2010, pp. 240-253.*

Breslin, John, et al., "The Future of Social Networks on the Internet", IEEE Internet Computing, vol. 11, Issue 6, Nov.-Dec. 2007, pp. 86-90.*

Li, Xin, et al., "Tag-Based Social Interest Discovery", WWW 2008, Beijing, China, Apr. 21-25, 2008, pp. 675-684.*

Sachan, Mrinmaya, et al., "Using Content and Interactions for Discovering Communities in Social Networks", WWW 2012, Lyon, France, Apr. 16-20, 2012, pp. 331-340.*

International Searching Authority, US, Notification of Transmittal of the International Search Report and the Written Opinion of the International Search Authority, or the Declaration for International application No. PCT/US2013/077341, mailed May 30, 2014, 5 pages.

Mirzaee, Vanesa, et al., "Improving personal and social information management with advanced tagging", Proc. of the 36th annual conf. of the Canadian Association for Information Science (CAIS), Univ. of British Columbia, Vancouver, Canada, pp. 1-8.

Rafelsberger, Walter, et al., "Games with a Purpose for Social Networking Platforms", HT '09, Torino, Italy, Jun. 29-Jul. 1, 2009, pp, 193-197.

Bernstein, Michael, et al., "Collabio: A Game for Annotating People within Social Networks", UIST '09, Victoria, BC, Canada, Oct. 4-7, 2008, pp. 97-100.

Barrington, Luke, et al., "User-Centered Design of a Social Game to Tag Music", Auto '93, Antonio, TX, Sep. 20-23, 1993, pp. 7-10.

Anonymous: "Canonical 1 ink element-Wikipedia, the free encyclopedia", Oct. 15, 2012 (Oct 15, 2012), XP055281381, Retrieved from the Internet: URL:https://en.wikipedia.org/w/index.php?title=Canonical_link_element&oldid=518000139 [retrieved on Jun. 17, 2016] 4 pages.

Extended European Search Report for EP Application No. 13866210.1—1955 /2936331 mailed Jun. 30, 2016 12 pages.

* cited by examiner

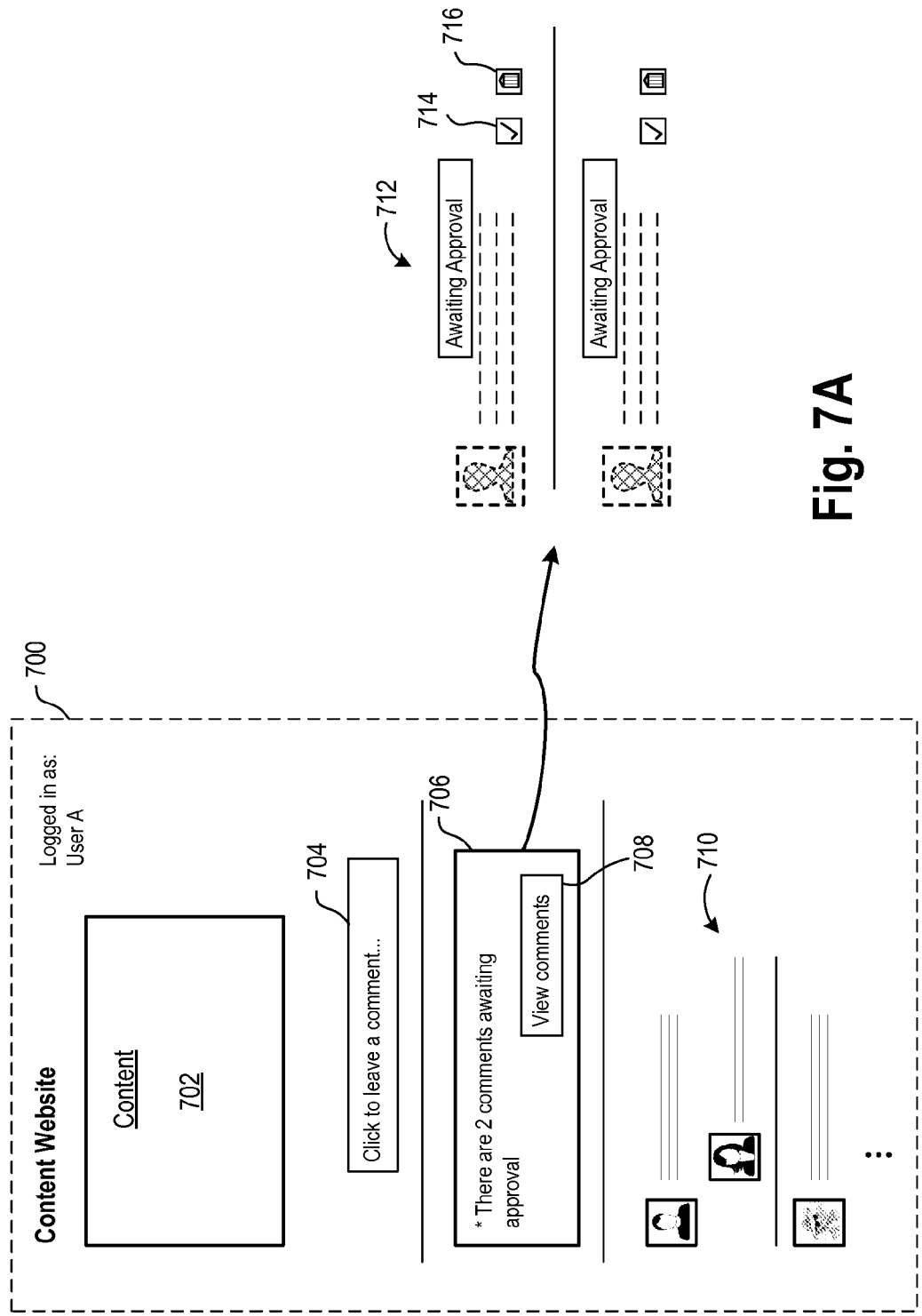

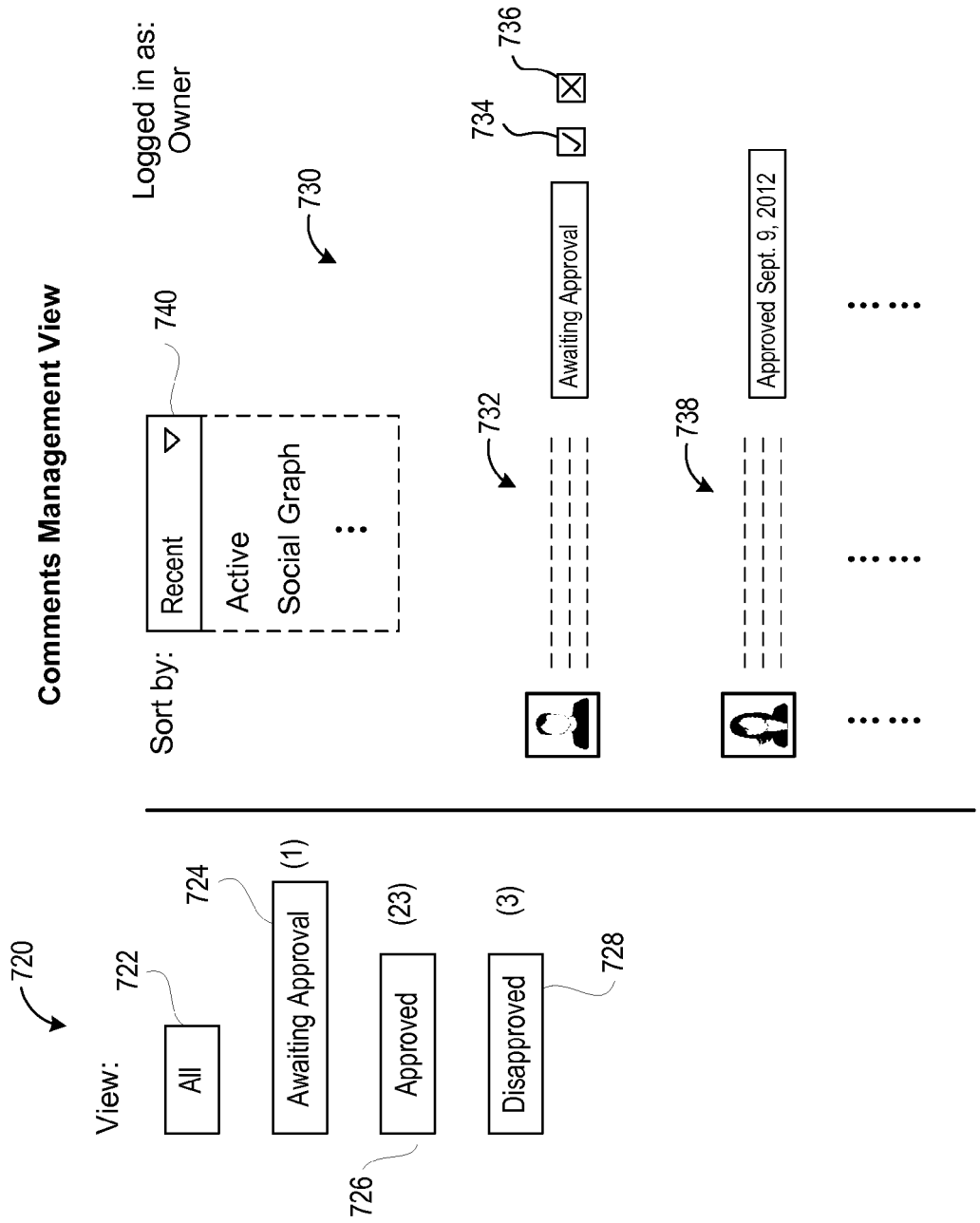

ially to U.S. Provisional
AGGREGATING INTERACTIONS FOR CONTENT ITEMS

CLAIM OF PRIORITY

The present application claims priority to U.S. Provisional Patent Application No. 61/745,179, filed Dec. 21, 2012, entitled "Aggregating Interactions for Content Items," the disclosure of which is incorporated by reference herein.

BACKGROUND

The present disclosure relates to methods, systems, and computer programs for integrating comments across multiple properties.

In recent years, the proliferation of the Internet has brought about significant changes in the ways users are able to interact with content and with each other. One example is the mechanism of commenting that is widely available on many internet properties. For a given internet page, users are able to create and leave comments which then become viewable to other users accessing the same internet page.

SUMMARY

Implementations of the present disclosure provide methods, systems, and computer programs for display of comments across multiple properties. It should be appreciated that the present disclosure can be implemented in numerous ways, e.g., a process, an apparatus, a system, a device or a method on a computer readable medium. Several implementations of the present disclosure are described below.

In accordance with some implementations, a method is provided, including the following method operations: receiving a request to generate a first post data item for display at a first location, the first post data item including a reference to a content item located at a second location; determining, based on the reference to the content item, a content identifier associated with the content item; associating the content identifier with the post data item; retrieving one or more post data items based on the content identifier and displaying the one or more post data items at the second location, the one or more post data items including the first post data item; wherein the method is executed by a processor.

In some implementations, retrieving the post data items includes searching a plurality of post data items to identify post data items having the content identifier associated therewith.

In some implementations, determining the content identifier includes performing a look-up of the reference to the content item to identify a corresponding canonical ID.

In some implementations, the reference to the content item is a uniform resource locator (URL) of the content item; and the content identifier is a data string.

In some implementations, the content identifier associated with the content item is a URL of the content item.

In some implementations, the content item is selected from the group consisting of a video, an article, an image, an audio file, a text item, a web page, a collection of web pages, or a combination of any two or more thereof.

In some implementations, retrieving the one or more post data items and displaying the one or more post data items is in response to a request to access the second location.

In some implementations, the method further includes: accessing a social graph of a first user who generated the request to access the second location; and prioritizing display of selected ones of the retrieved post data items which were generated by secondary users within the social graph of the first user.

In some implementations, the method further includes: setting an approval status of the new post data item for display at the second location; and wherein retrieving the one or more post data items includes identifying the approval status of the one or more post data items.

In some implementations, the first location is defined by a first web page; and the second location is defined by a second web page.

In another implementation, a method is provided, including the following method operations: receiving a request to generate a first post data item for display in association with a first content item; determining a content identifier associated with the first content item, the content identifier also being associated with a second content item; associating the content identifier with the post data item; in response to a request to access the second content item, retrieving one or more post data items based on the content identifier and displaying the one or more post data items in association with the second content item, the one or more post data items including the first post data item; wherein the method is executed by a processor.

In some implementations, retrieving the post data items includes searching a plurality of post data items to identify post data items having the content identifier associated therewith.

In some implementations, determining the content identifier includes identifying a canonical ID associated with the first content item.

In some implementations, the content identifier is a data string.

In some implementations, the content identifier is a URL.

In some implementations, the first content item or the second content item is selected from the group consisting of a video, an article, an image, an audio file, a text item, or a combination of any two or more thereof.

In some implementations, the method further includes: accessing a social graph of a first user who generated the request to access the second content item; and prioritizing display of selected ones of the retrieved post data items which were generated by secondary users within the social graph of the first user.

In some implementations, the method further includes: setting an approval status of the first post data item for display in association with the second content item; and wherein retrieving the one or more post data items includes identifying the approval status of the one or more post data items.

In some implementations, the first content item is defined on a first web page; and the second content item is defined on a second web page.

In another implementations, a tangible computer readable medium having program instructions embodied thereon is provided, the program instructions including the following: program instructions for receiving a request to generate a first post data item for display at a first location, the first post data item including a reference to a content item located at a second location; program instructions for determining, based on the reference to the content item, a content identifier associated with the content item; program instructions for associating the content identifier with the post data item; program instructions for retrieving one or more post data items based on the content identifier and displaying the one or more post data items at the second location, the one or more post data items including the first post data item.

In some implementations, retrieving the post data items includes searching a plurality of post data items to identify post data items having the content identifier associated therewith.

In some implementations, determining the content identifier includes performing a look-up of the reference to the content item to identify a corresponding canonical ID.

In some implementations, the reference to the content item is a uniform resource locator (URL) of the content item; and the content identifier is a data string.

In some implementations, the content identifier associated with the content item is a URL of the content item.

In another implementation, a method is provided, the method including the following method operations: receiving a request to generate a post data item at a first location, the post data item including a reference to a content item located at a second location; accessing a notification tag associated with the content item, the notification tag identifying a destination for notification; sending a notification to the destination, the notification identifying the post data item; wherein the method is executed by one or more processors.

In some implementations, the first location is defined by a social network page; the second location is defined by a content page; and the social network page and the content page do not share a common domain.

In some implementations, the destination is defined by one or more of an e-mail address, a username, or a user identifier on a social network.

In some implementations, the request to generate the post data item identifies the post data item as a public item; and sending the notification is in response to detection of the post data item as a public item.

In some implementations, the notification provides access to a moderation interface for approving or disapproving the post data item for display at the second location.

In some implementations, the reference to the content item is a URL.

In some implementations, the content item is selected from an image, video, audio, or text.

In some implementations, the method further includes displaying the post data item at the second location in a stream of post data items configured to aggregate post data items referencing the content item from multiple locations.

In another implementation, a method is provided, the method including the following method operations: receiving a request from a first user to generate a post data item for display on a first property, the post data item including a reference to a content item located on a second property; identifying an owner to be notified when the content item is shared in the post data item based on the request, wherein identifying the owner includes performing a look-up in a registry, the registry defining a correlation between the reference and the identified owner; generating a notification to the owner, the notification identifying the post data item; wherein the method is executed by one or more processors.

In some implementations, the first property is defined by a social network; and the second property is not defined by the social network.

In some implementations, the first property is defined by a first web page; the second property is defined by a second web page; the first web page and the second web page do not share a common domain.

In some implementations, the reference to the content item is a URL.

In some implementations, identifying the owner includes identifying an address of the owner to which the notification is sent.

In some implementations, generating the notification includes one or more of sending an e-mail notification to the owner or sending a mobile push notification to the owner.

In some implementations, the content item is selected from an image, video, audio, or text.

In some implementations, the notification provides access to a moderation interface for approving or disapproving the post data item for display on the second property.

In another implementation, a non-transitory computer-readable medium having program instructions embodied thereon is provided, the program instructions including the following: program instructions for receiving a request to generate a post data item at a first location, the post data item including a reference to a content item located at a second location; program instructions for accessing a notification tag associated with the content item, the notification tag identifying a destination for notification; program instructions for sending a notification to the destination, the notification identifying the post data item.

In some implementations, the first location is defined by a social network page; the second location is defined by a content page; and the social network page and the content page do not share a common domain.

In some implementations, the destination is defined by one or more of an e-mail address or a username.

In some implementations, the request to generate the post data item identifies the post data item as a public item; and sending the notification is in response to detection of the post data item as a public item.

In some implementations, the notification provides access to a moderation interface for approving or disapproving the post data item for display at the second location.

In some implementations, the reference to the content item is a URL.

In some implementations, the content item is selected from an image, video, audio, or text.

In some implementations, the program instructions further include program instructions for displaying the post data item at the second location in a stream of post data items configured to aggregate post data items referencing the content item from multiple locations.

These and other implementations may provide one or more of the following advantages. Various implementations provide for display of post data items (e.g. comments, postings, etc.) across various properties. Comments/posts which are about a single subject or content item, but which were generated on different properties, can be made available for display on any property presenting the same subject or content item. In this manner, conversations which would otherwise only appear in disparate locations, can be unified for presentation in the same location when appropriate. Additionally, display of comments can be based on social graph data to provide an experience that is tailored to the viewer. For example, the viewer may see comments which are generated by users in his/her social graph prioritized for viewing, thereby providing a personalized experience.

Other aspects will become apparent from the following detailed description, taken in conjunction with the accompanying drawings.

BRIEF DESCRIPTION OF THE DRAWINGS

The disclosure may be understood by reference to the following description taken in conjunction with the accompanying drawings.

FIG. 7A illustrates an interface for moderating comments about a content item by an owner of the content item, in accordance with implementations of the disclosure.

FIG. 7B illustrates an interface for moderating comments which have been posted relating to a content item, in accordance with implementations of the disclosure.

DETAILED DESCRIPTION

The following implementations describe methods, computer programs, and systems for the display of comments across multiple properties.

It will be apparent, that the present implementations may be practiced without some or all of these specific details.

Figure 1:
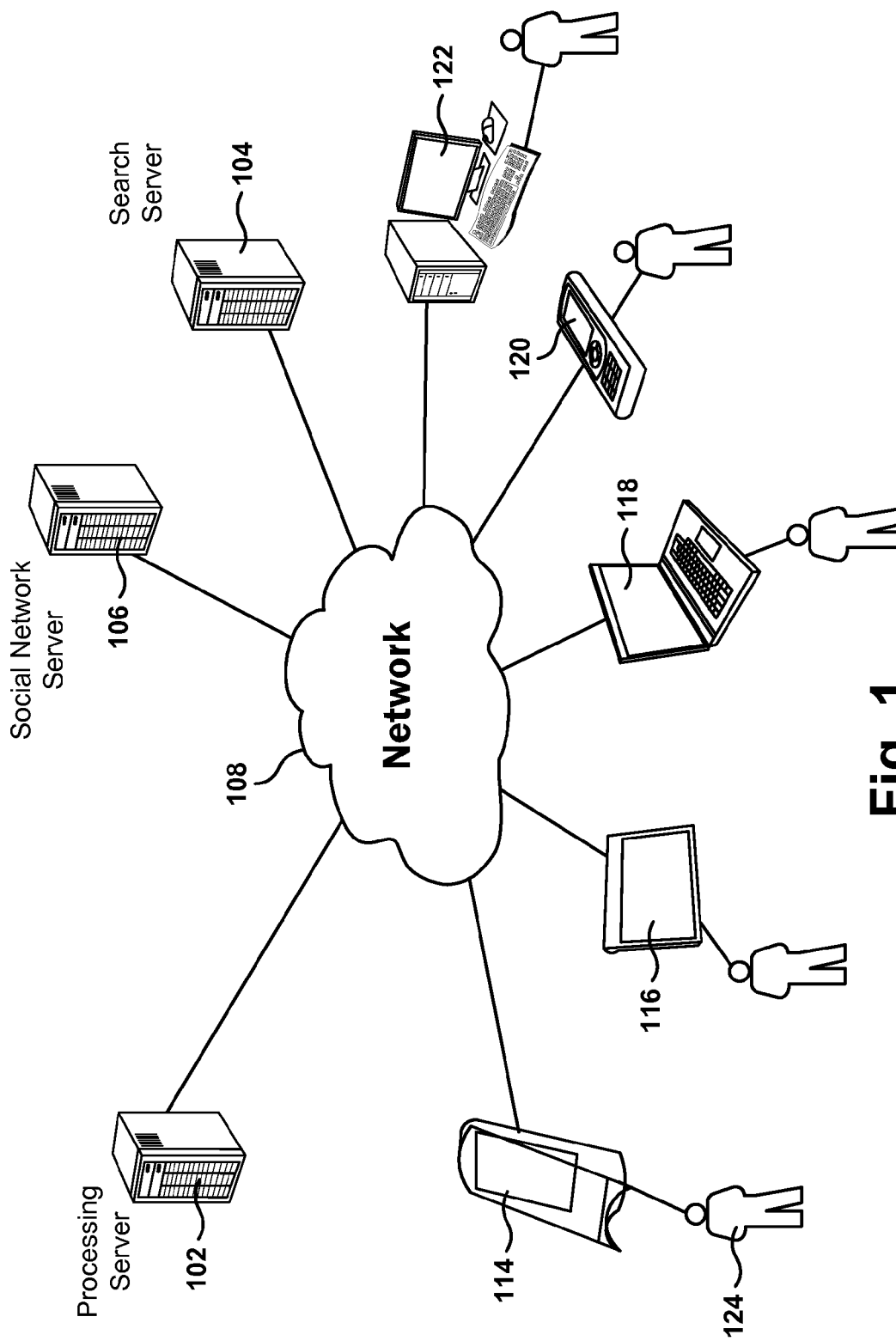
FIG. 1 illustrates an example architecture of a system for implementing implementations of the disclosure, in accordance with implementations of the present disclosure.

FIG. 1 provides one example architecture of a system that may utilize implementations described herein. Users 124 interact with each other in the context of a social network, where users can include real people and entities. Each user has an account in the social network, and the account includes at least a user name. In addition, each account can include a profile of the user with additional information about the user, e.g., birth date, residence, favorite activities, etc. The user can be in control of what information is added to the profile, and what information is shared with others. A user may access the social network through different devices, e.g., a smart phone 114, a tablet computer 116, a laptop 118, a mobile phone 120, a personal computer 122, or any computing device that provides access to the Internet. Of course, the illustrated devices are only examples.

In accordance with some implementations, social network server 106 delivers services that enable users to interface with each other. The social network provides a site that enables users to define user accounts, which can be accounts for people and entity accounts. Through those accounts, users are able to connect with their friends, group of friends, entities, groups of entities, etc. In some implementations, the relationships established in the social network may be utilized in other contexts. Processing server 102 can be configured to perform various additional functions related to the social network, e.g., executing applications which run within the social networking environment, or processing data relating to external sites which have integrated social functionality. Search server 104 provides Internet search capabilities.

It is noted that the implementations illustrated in FIG. 1 are illustrative of certain implementations. Other implementations may utilize different servers, have the functionality of one server distributed over a plurality of servers, have the functionality of two or more servers combined into a single server, have a different amount of user categories in the social network, categorize users by different criteria, etc. The implementations illustrated in FIG. 1 should therefore not be interpreted to be exclusive or limiting, but rather illustrative.

Figure 2:
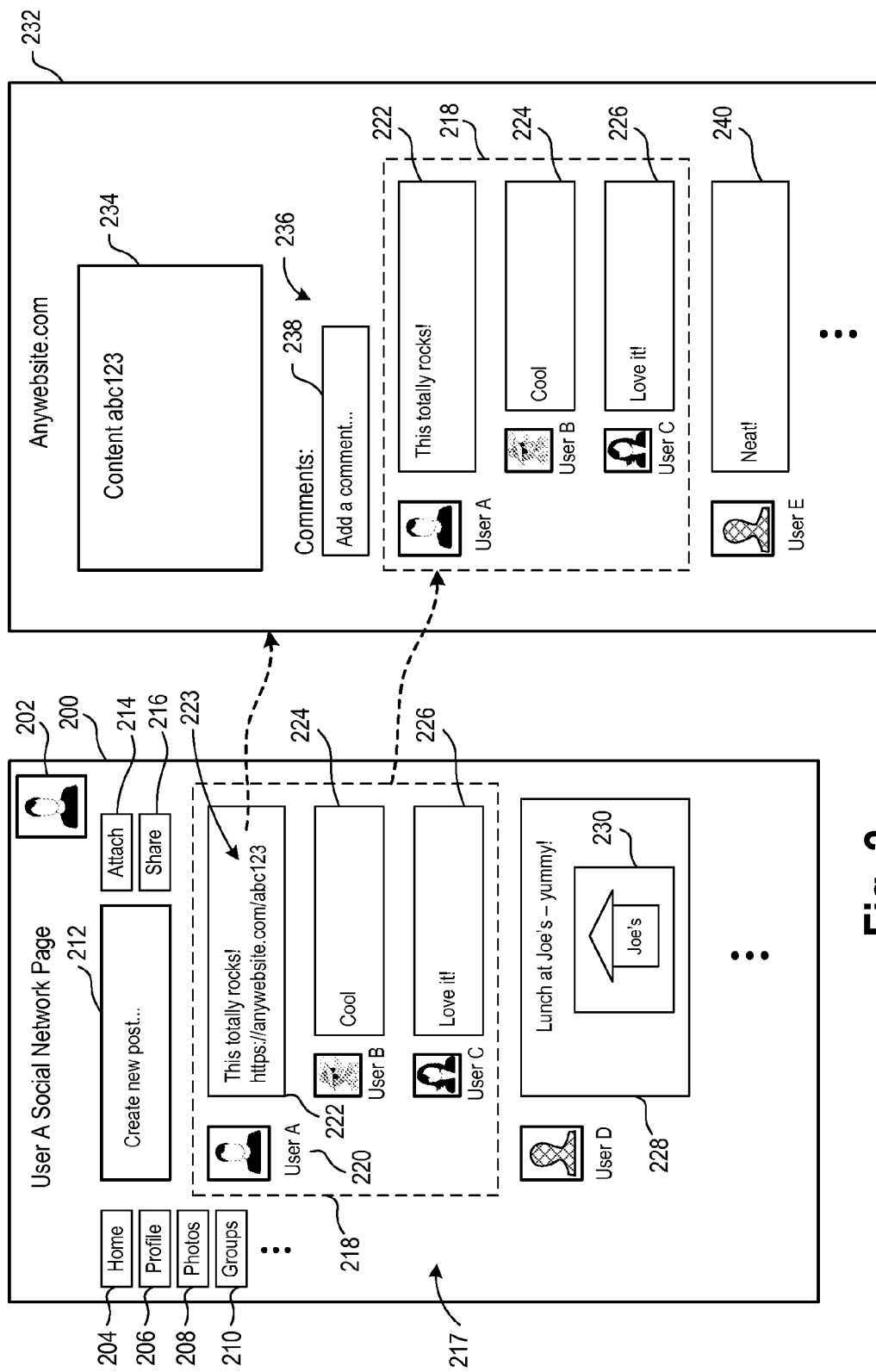
FIG. 2 illustrates post data items posted on a social network page being made available for display on a content page, in accordance with implementations of the disclosure.

FIG. 2 illustrates post data items posted on a social network page being made available for display on a content page. For purposes of the present disclosure, a post, posting, or comment can be understood as post data items, and the terms may be used interchangeably to identify user-generated content that is posted on a web page or property. For example, in the context of a social network, users typically generate "posts" or "postings" that appear in their news feed and that of their friends, whereas on a content website, users typically generate "comments" in response to certain content featured on the website. However, each of these pieces of user-generated data (post, posting, comment, etc.) may be characterized as post data items that can by made available for display across properties. These post data items are typically displayed in "feeds" or "streams" on social networking pages or content webpages containing content to which the post data items pertain. In the illustrated implementation, the social network page 200 of a user A is shown. A profile picture 202 is included in the social network page 200. A home button 204 directs to a home view of the user A's social network account. A profile button 206 directs to profile information and settings. A photos button 208 provides access to the user A's photos stored on the social network. The groups button 210 provides access to organizational groups into which users who are connected to user A on the social network may be organized. Other buttons or links may be provided to various other aspects of user A's social network account, in accordance with various implementations of the present disclosure.

To create a new posting on the social network, the user A may enter text into a text box 212. An attachment button 214 enables the user to insert a content item into the post, e.g. a picture, audio, or video. Insertion of the content item may entail submission of a URL of the content item. In some implementations, when a URL is entered into the text box 212, the URL is identified and a presentation of the content located by the URL is shown in the posting. When the user A has completed writing the text and inserting any content items into the post, the user can create and share the post on the social network by pressing the share button 216.

In the illustrated view of the user A's social network page, a news feed 217 is provided, which displays various postings by friends of the user and those of the user A. The user A has created a posting 222, which has an associated identifier 220, including a profile picture and name, that user A is the author of the posting 222. The posting 222 includes a link 223 to a content item 234 available on a separate website "anywebsite.com." In response to user A's posting 222, users B and C have posted responses 224 and 226, respectively. The posting 222 and its associated responses 224 and 266 collectively define a posting unit 218. User A's news feed 217 also includes a posting 228 by a user D which includes a picture 230.

The page 232 of the website "anywebsite.com" provides access to the content item 234, for which user A's post 222 included a link. It will be appreciated that in various implementations, the link 223 can be a link to the content item 234 itself, or a link to the page 232 which presents the content item 234, or a link to some other page or resource which provides access to the content item 234. It will also be appreciated that the content item 234 can be any of various kinds of content, including image content, audio content, video content, textual content, etc. The page 232 includes a comments section 236, in which users may post comments and view comments posted by others. For example, in the text box 238, a user may enter text to create a new comment that is ostensibly about the content item 234 shown on the page 232. In the illustrated implementation, a comment 240 has been posted by a user E.

As the posting 222 includes a link to the content item 234, the posting unit 218 is about or otherwise relevant to the content item 234. It may therefore be desirable to include the posting unit 218 within the comments section 236 of the page 232 presenting the content item 234. In the illustrated implementation, the posting 222 as well as the responses 224 and 226 which together define the posting unit 218 are identified as relating to the content item 234 or page 232 and are therefore included in the comments section 236 of the page 232. When the posting 222 is displayed on the page 232 of the content website, the link 223 may be removed, as it is redundant in view of the page 232 featuring the content 234. The posting unit 218 originated on the social network, but is made available for display on the website hosting the content referenced by the posting 222. In this manner, user-generated content on one site (or property or location) that relates to content of another site can be synchronized and displayed across both sites.

Figure 3:
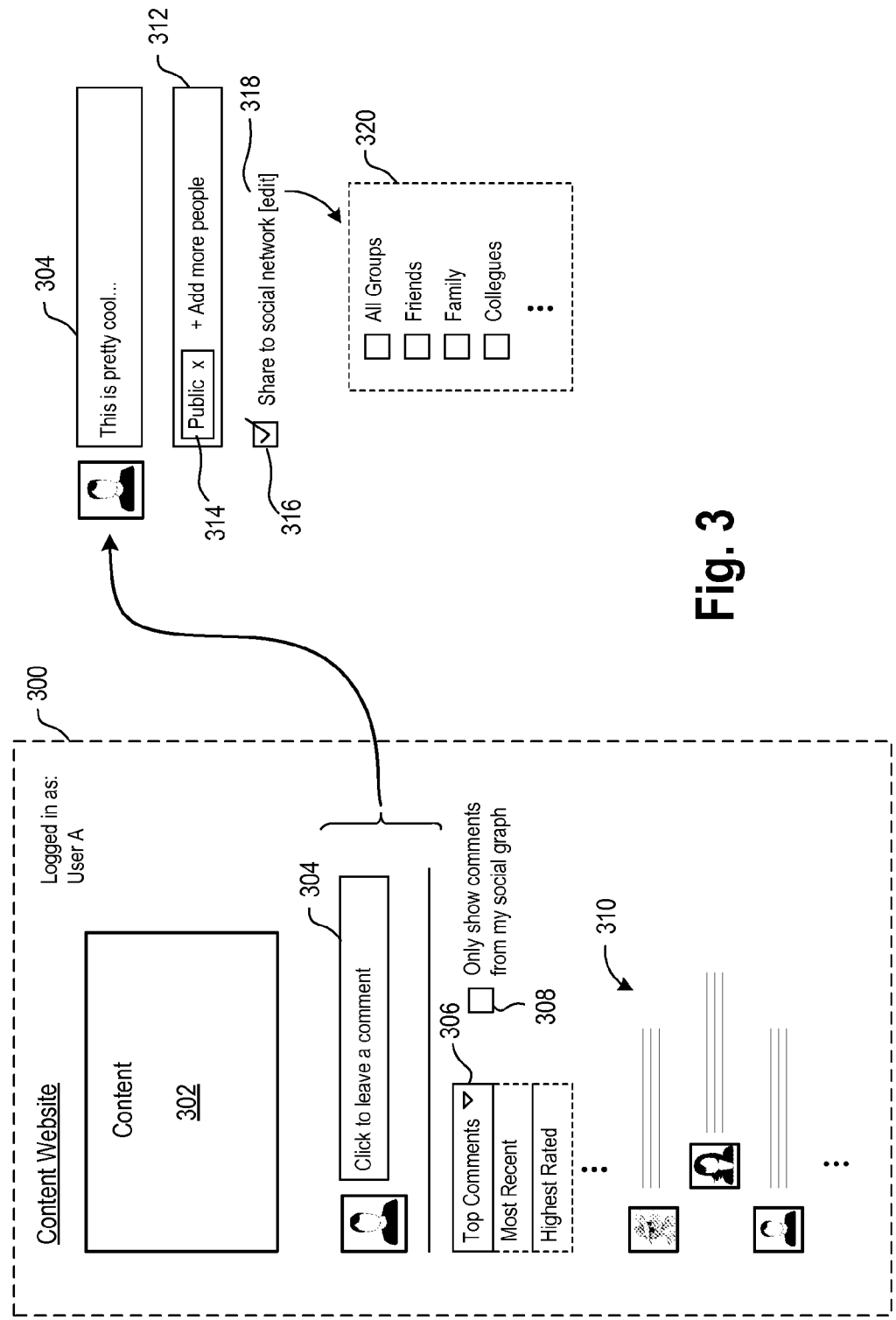
FIG. 3 illustrates posting of a comment on a website, in accordance with implementations of the disclosure.

FIG. 3 illustrates posting of a comment on a website. In the illustrated implementation, the user A is logged in to the website and accesses the page 300 of the website. The page 300 features content 302, which may be any of various kinds of content in accordance with various implementations of the disclosure. The user A may click in the box 304 to enter text for a new comment to be posted in the comments section 310 of the page 300.

The comments shown in the comments section 310 may be selectively displayed or sorted based on various characteristics of the comments. For example, a drop-down menu 306 is provided to enable the user to select from various sort criteria, such as sorting by the most recent or highest rated comments. (Comments may include a mechanism enabling users to express approval or disapproval of a comment, thereby conferring a rating for a comment based on the approval or disapproval expressed by users.) In the illustrated implementation, a "Top comments" sorting may establish a sort of the comments based on a variety of criteria, such as a combination of recency and rating, in addition to other factors. Additional factors can include, by way of example, whether or not the author of a comment is in the social graph of the current user, the number of responses to a comment, the length of a comment and/or its responses, the inclusion of links in a comment, the inclusion of predefined keywords in a comment, geographic proximity of the author of a comment to the viewer, language of a comment, etc.

A checkbox 308 enables the user A to configure the comments section 310 to display only comments from users that are in the user A's social graph.

When the user A clicks on the box 304 to define a new comment, he/she can be presented with additional options relating to the new comment. For example, in a box 312, the user A can designate those to whom the comment will be shared. In the illustrated implementation, by default a public designation 314 indicates that the comment will be shared with the public, meaning that the comment will be visible to any other user visiting the page 300.

A checkbox 316 allows the user A to share the new comment to his/her social graph on a social network. By clicking on an edit link 318, the user A can choose from various groups of users within user A's social graph to whom the comment will be shared on the social network. The new comment will therefore appear as a posting within the social network news feed of those users within the designated groups of user A's social network. In some implementations, the comment may have a link to the page 300, or some other identifier of the page 300 or content 302, appended to it when displayed in news feeds of users on the social network. In this manner, context for the comment is provided when it is displayed on the social network.

Figure 4:
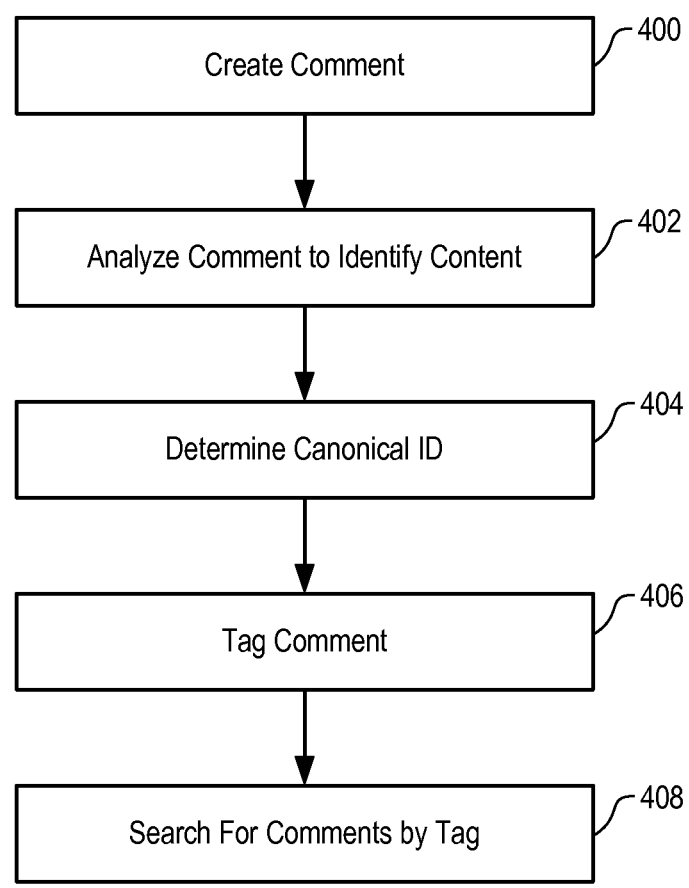
FIG. 4 illustrates a method for displaying comments or postings across various properties, in accordance with implementations of the disclosure.

FIG. 4 illustrates a method for displaying comments or postings across various locations, e.g., on one or more properties, websites, or other locational instances. At method operation 400, a comment is created. At method operation 402, the comment is analyzed to identify content that is referenced by the comment. In some implementations, the identification of the content can entail identification of a URL or other identifier of content referenced by the comment. At method operation 404, an identifier, e.g., a canonical identifier (ID), is determined for the identified content. The canonical ID may be, in the case of an included URL serving as the identifier of content referenced by the comment, the URL itself or a canonical URL that is determined based on the URL included in the comment.

A canonical ID is a singular identifier associated with a content item or a content reference. Multiple content items or their references can be associated with the same canonical ID. However, no two canonical ID's can be assigned to the same content item or content reference. By way of example, multiple URL's may locate substantially the same content item (e.g. different URL's may direct/redirect to the same web page or item, or to different instances of an item that are substantially the same), separate media files may differ in structure (e.g. different compression, bitrate, encoding scheme, etc.) while encoding for the same underlying content, etc. A process for association of a canonical ID with a specific content item or its reference can include analysis of the content item to determine if it is similar to another content item by greater than a predefined threshold. If so, then the two content items determined to be substantially similar and are associated with the same canonical ID. A content item that is determined to not be substantially similar to another content item can be associated with its own unique canonical ID that is not shared with other content items.

At method operation 406, the comment is tagged with the determined canonical ID. At method operation 408, in response to a request for comments related to the content, a search is performed for comments that have been tagged with the canonical ID. The request for comments related to the content can be made in service of or as part of a request for a page featuring the content identified by the canonical ID. It will be appreciated that in accordance with the presently described method, comments can be created on any property (e.g. original host site of the content, social network, third-party websites, mobile application, etc.) that affords users the ability to create a comment referencing the content, and because such comments will be tagged with the same canonical ID, a subsequent search for comments based on the canonical ID will return all of these comments regardless of their origin. In this manner, comments which can be identified as relating to a specific content can be displayed across multiple properties.

Figure 5A:
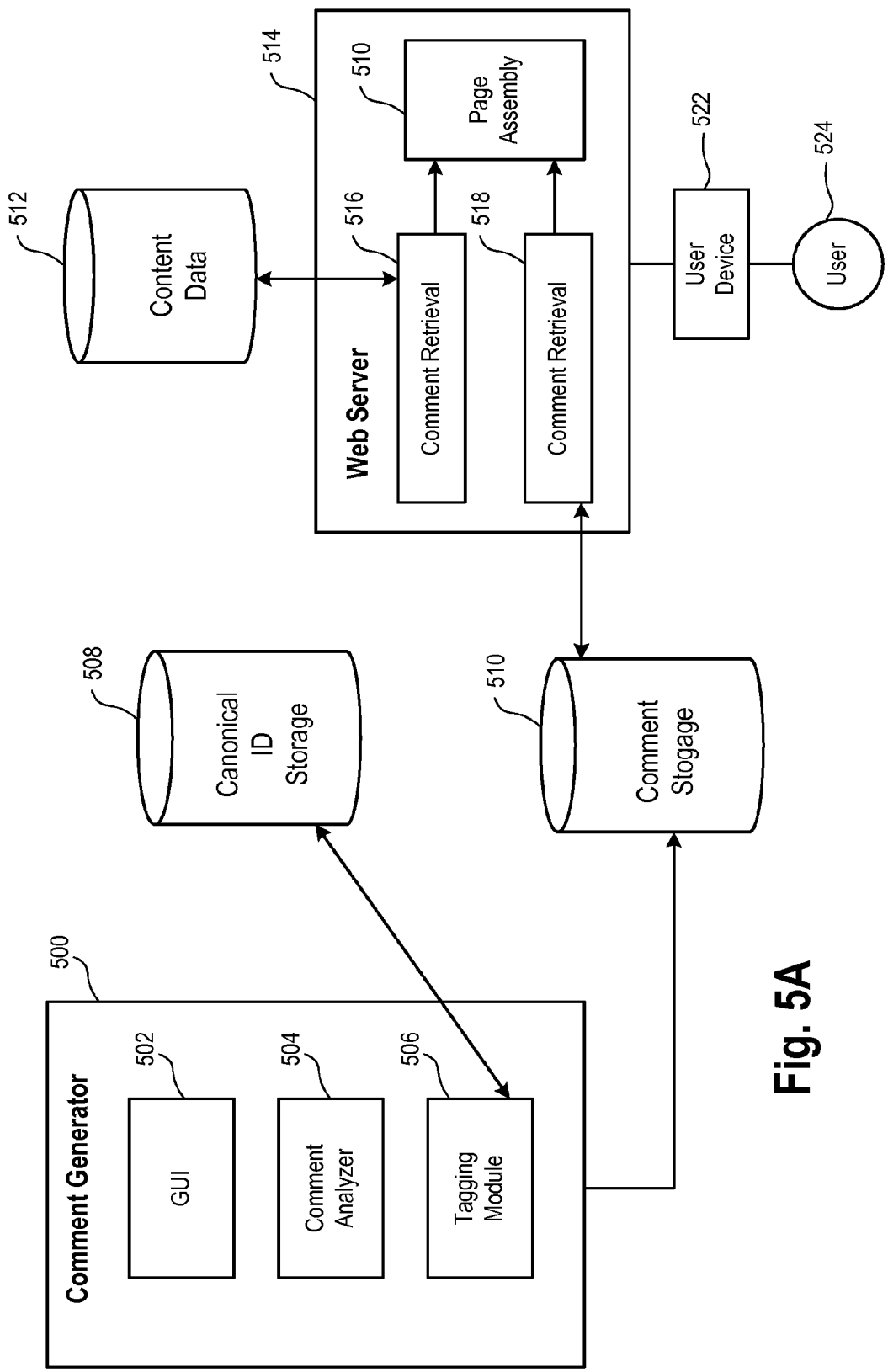
FIG. 5A illustrates a system for comment display, in accordance with implementations of the present disclosure.

FIG. 5A illustrates a system for comment display, in accordance with implementations of the present disclosure. A comment generator 500 includes a GUI for creation of a comment. According to the GUI, input is received to define the comment. A comment analyzer 504 analyzes the comment to identify content referenced by the comment, such as by the inclusion of a URL in the comment. A tagging module 506 references a canonical ID storage 508 to determine a canonical ID for the identified content referenced by the comment, and tags the comment with the canonical ID. The comment is stored in a comment storage 510.

A user 524 operates a device 522 to request a page, featuring the content, from web server 514. The web server 514 includes a content retrieval module 516 for retrieving content for the requested page from a content data storage 512. A comment retrieval module 518 retrieves comments from the comment storage 510 related to the retrieved content for the requested page. The related comments are retrieved by searching for comments tagged with a canonical ID associated with the retrieved content for the requested page. A page assembly module 520 assembles the requested page before serving it to the device 522 for consumption by the user 524.

Figure 5B:
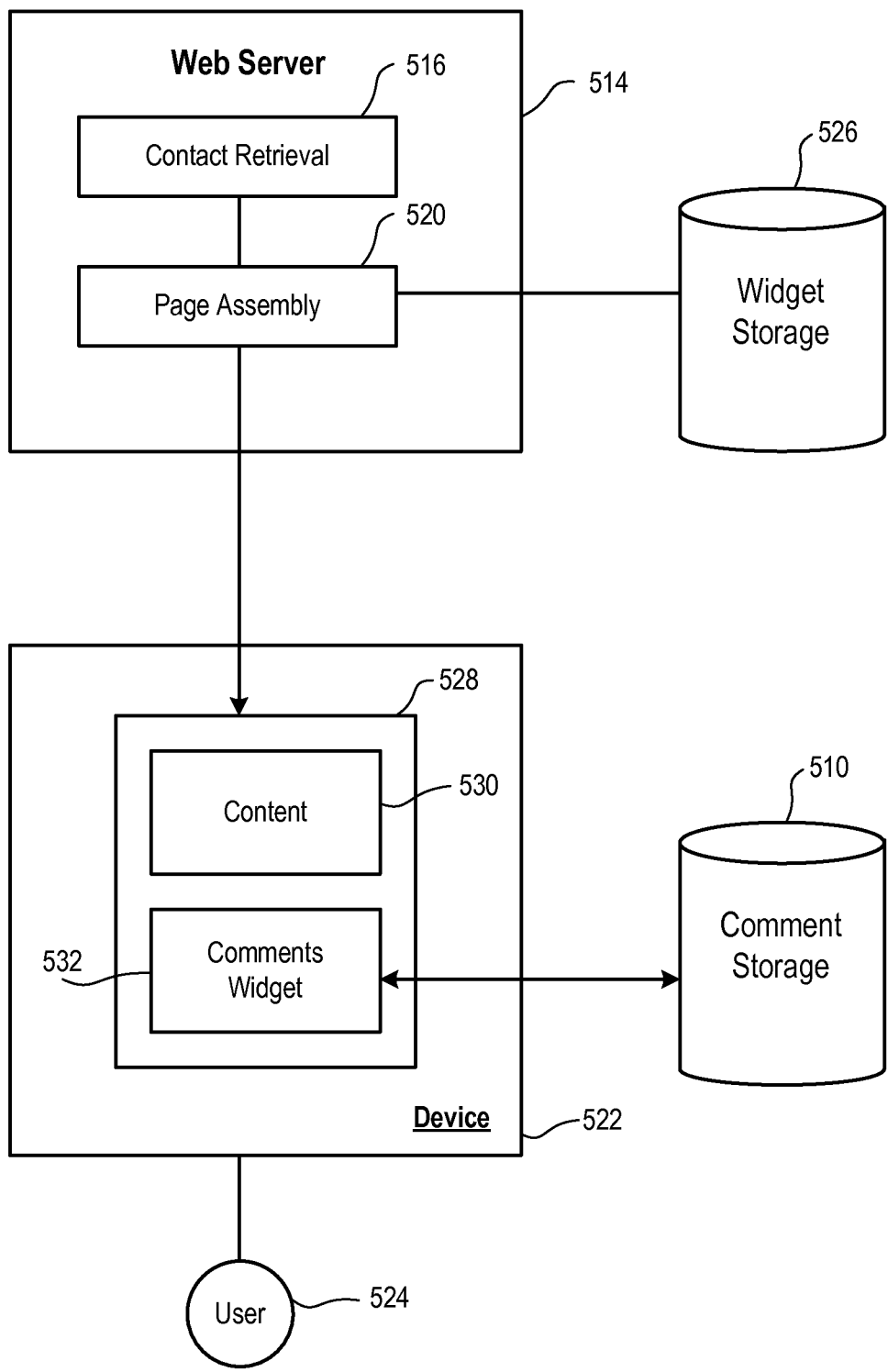
FIG. 5B illustrates a system for display of comments or postings, in accordance with implementations of the disclosure.

FIG. 5B illustrates a system for display of comments or postings, in accordance with implementations of the disclosure. The web server 520 includes page assembly module 520, which retrieves a comments widget for inclusion in a page that is sent to device 522 for rendering. The comments widget 532 can be presented in an iframe as part of page 528, alongside content 530 of the page 528. The comments widget 532 is configured to retrieve comments from the comment storage 510 which are relevant to the content 530 shown on the page 528.

Figure 6:
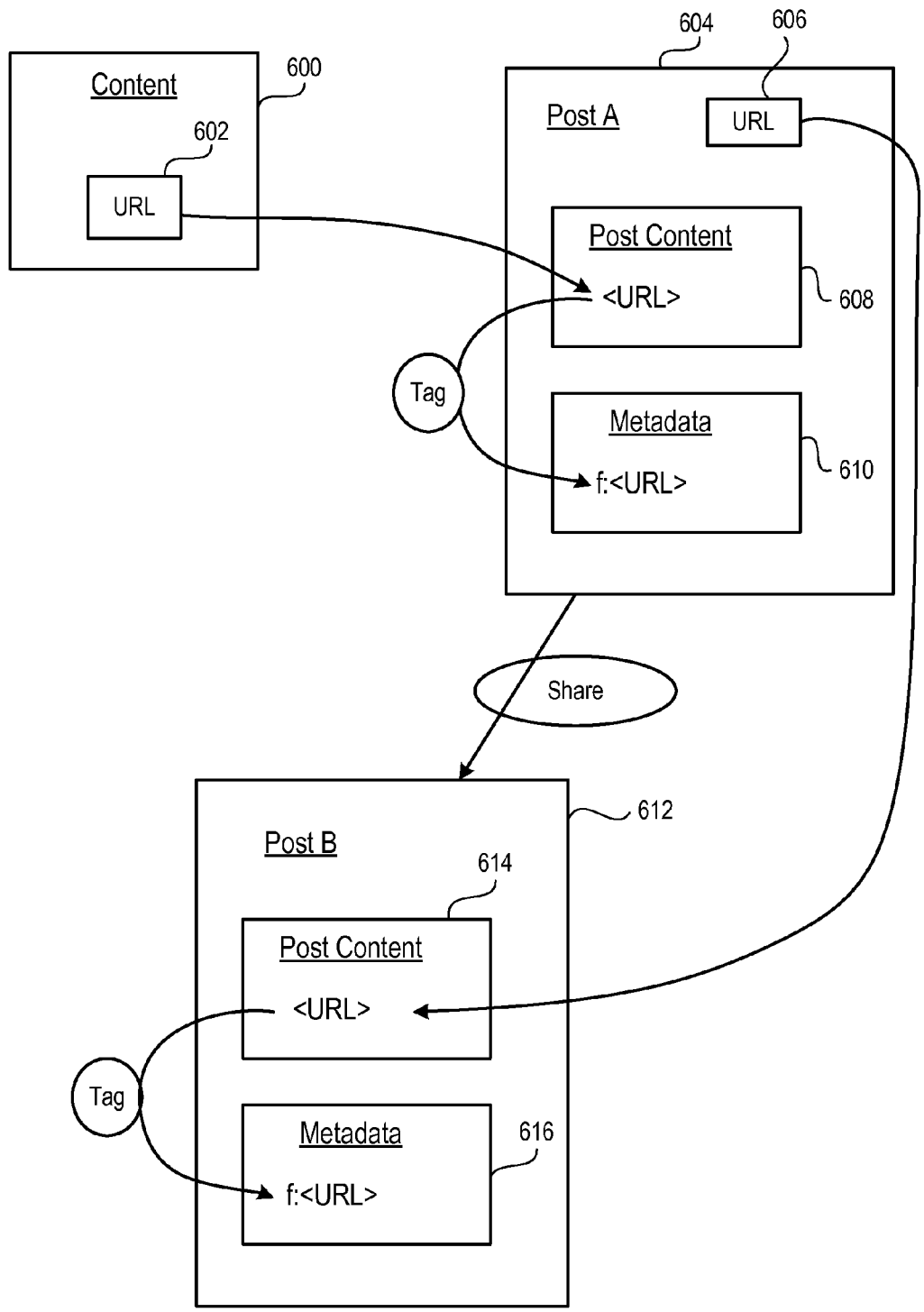
FIG. 6 conceptually illustrates a post about a content item, and a subsequent post about the earlier post, in accordance with implementations of the disclosure.

FIG. 6 conceptually illustrates a post about a content item, and a subsequent post about the earlier post. A content item 600 has an associated URL 602. A post 604 includes post content 608 which defines the information that will be displayed when the post 604 is displayed. The post content 608 may include various information, including text entered by the user, an attached image/audio, links, etc. In the illustrated example, the post content 608 includes the URL 602 of the content 600. The post 604 also include metadata 610. In the metadata 610, a tag is defined by a canonical URL which has been determined based on identification of the URL present in the post content 608. The canonical URL may be the same as or different than the URL 602. Thus, the post 604 is tagged with a canonical URL identifying the content 600.

In one scenario, the post 604 may be shared with others through the generation of a later post 612. The post content 614 of this later post 612 may thus include the URL 606 of the earlier post 604. The post metadata 616 of the later post 612 may also include a tag identifying the post 604, which can be the URL 606 of the post 604 or a canonicalized version of it.

When a search is performed for posts related to the content 600, posts tagged with the canonical ID associated with the content 600 are retrieved. These will include the post 604, but not the post 612, as it is not tagged as such. In this manner, posts about the content can be retrieved apart from later posts that reshare an earlier post about the content. This can be desirable, for example, when serving a page which features the content 600, for which it is not necessary to retrieve additional posts which are reshares of existing posts about the content. On the other hand, it may be desirable to understand or present a given post along with all of its reshares, in which case the presently described configuration facilitates retrieval of posts tagged with the URL 606 of the post 604, so as to include post 612 which is a reshare of the post 604.

FIG. 7A illustrates an interface for moderating comments about a content item by an owner of the content item. The web page 700 presents content item 702. In the illustrated view, the user is logged in as the owner of the content item. The illustrated page 700 can be of a website where content items can be created, uploaded, and edited by content owners, as well where such content items are hosted and made available for download or consumption (e.g. viewing an image or video, listening to an audio file, etc.) by other users. In a box 704, the owner can enter text to create a new comment. Comments relating to the content item 702 are displayed in a comments display region 710.

In some implementations, a content owner can be provided with options to moderate comments. For example, a content owner may predefine settings governing how new comments are handled. One possible setting would configure comments to be automatically approved for display unless the owner indicates otherwise. Another possible setting would configure comments to be not approved unless the owner specifically approves them for display.

In the illustrated implementation, a notification 706 informs the owner that there are comments awaiting approval. By clicking on the button 708, the owner is able to access the comments 712 which have yet to be approved. These comments will not be displayed to other users accessing the page 700 unless specifically approved by the owner. The owner may indicate approval of the comment for display by activating button 714. Alternatively, the owner may delete a pending comment by activating button 716.

It will be appreciated that at the time a comment about a content item is generated, it can be determined whether or not the content item has an identifiable owner. If an owner can be identified, then the settings predefined by the owner for the specific content item can govern the handling and display of the new comment on the content item's webpage. However, if no owner exists, then the comment can be included for display alongside other comments on the content item's webpage. Whether or not the comment is actually displayed when a given user accesses the content item's webpage may depend on other factors, as described elsewhere herein, e.g. recency, ranking, etc.

FIG. 7B illustrates an interface for moderating comments which have been posted relating to a content item, in accordance with an implementation of the disclosure. A comments management view is shown for allowing an owner of a content item or page, for which comments may be posted by third-party users, to moderate the display of such comments. In the illustrated implementation, a view selection portion 720 of the interface facilitates selection of which comments to display in a comments display region 730 of the interface. By way of example, a button 722 can be selected to display all comments which are available for viewing by the owner. As discussed elsewhere herein, it should be appreciated that not all comments which reference the content item or page of the owner will necessarily be available for viewing by the owner. For example, a comment by a user may not be available for viewing by the owner if the comment is not publicly shared, but instead shared with selected users (excluding the owner), e.g. individuals or subgroups in the commenting user's social graph. Thus, selection of the button 722 will not cause display of such privately shared comments, but will facilitate display of comments to which the owner does have access.

A button 724 can be selected to cause display of comments which have yet to be approved by the owner for display on the owner's page. The number of such comments which are awaiting approval may be displayed on or alongside the button 724. In the illustrated implementation, there is one comment awaiting approval by the owner. A button 726 can be selected to display comments which have been approved for display on the owner's page. In the illustrated implementation there are 23 comments which have been approved. A button 728 can be selected to cause display of comments which have been disapproved from being displayed on the owner's page. In the illustrated implementation, there are three comments which have bee disapproved. It should be appreciated that a comment that has been disapproved for display on the owner's page may nonetheless still be displayed in another context, e.g. in the social networking stream of the commenting user or that of users in the commenting user's social graph.

In the illustrated implementation, in the comments display region 730, a comment 732 is shown. Comment 732 is indicated as awaiting approval by the owner. The owner may select a button 734 to approve the comment 732 or a button 736 to disapprove the comment. If approved, then the comment 732 will be available for display on the owner's page, and may or may not be displayed for a given user accessing the page depending upon various factors are described elsewhere. If disapproved, then the comment 732 will not be available for display on the owner's page. Below the comment 732, a comment 738 is shown. The comment 738 is indicated as having already been approved on a specified date.

Additionally, a sorting menu 740 facilitates selection of a method for sorting the display of comments in the comments display region 730. For example, the comments may be sorted by recency of posting or other activity related to the posting (e.g. response posted). Comments may also be sorted based on activity relating to the comment (e.g. recent replies to a specific comment, resharing of the comment), social graph data of the user, etc.

The foregoing implementation has generally been described to facilitate the owner's ability to approve and disapprove comments for display on the owner's page. In such an implementation, comments may be pre-filtered, such that a comment is not available for display on the owner's page unless the owner expressly approves the comment. However, in another implementation, comments can be post-filtered, wherein a comments is available for display on the owner's page unless the owner expressly disapproves the comment. For the various implementations, the comments management view can include different or additional options. For example, there may be provided an option to show "unread" comments, that when selected, causes display of comments which have not been viewed by the owner. Whether a comment has been viewed by the owner may be determined based on, for example, the owner having clicked on the comment or otherwise selected the comment for viewing. Another option may cause display of "new" comments, which are comments that have been received since the last time the owner logged in and accessed the comments management view.

Figure 8A:
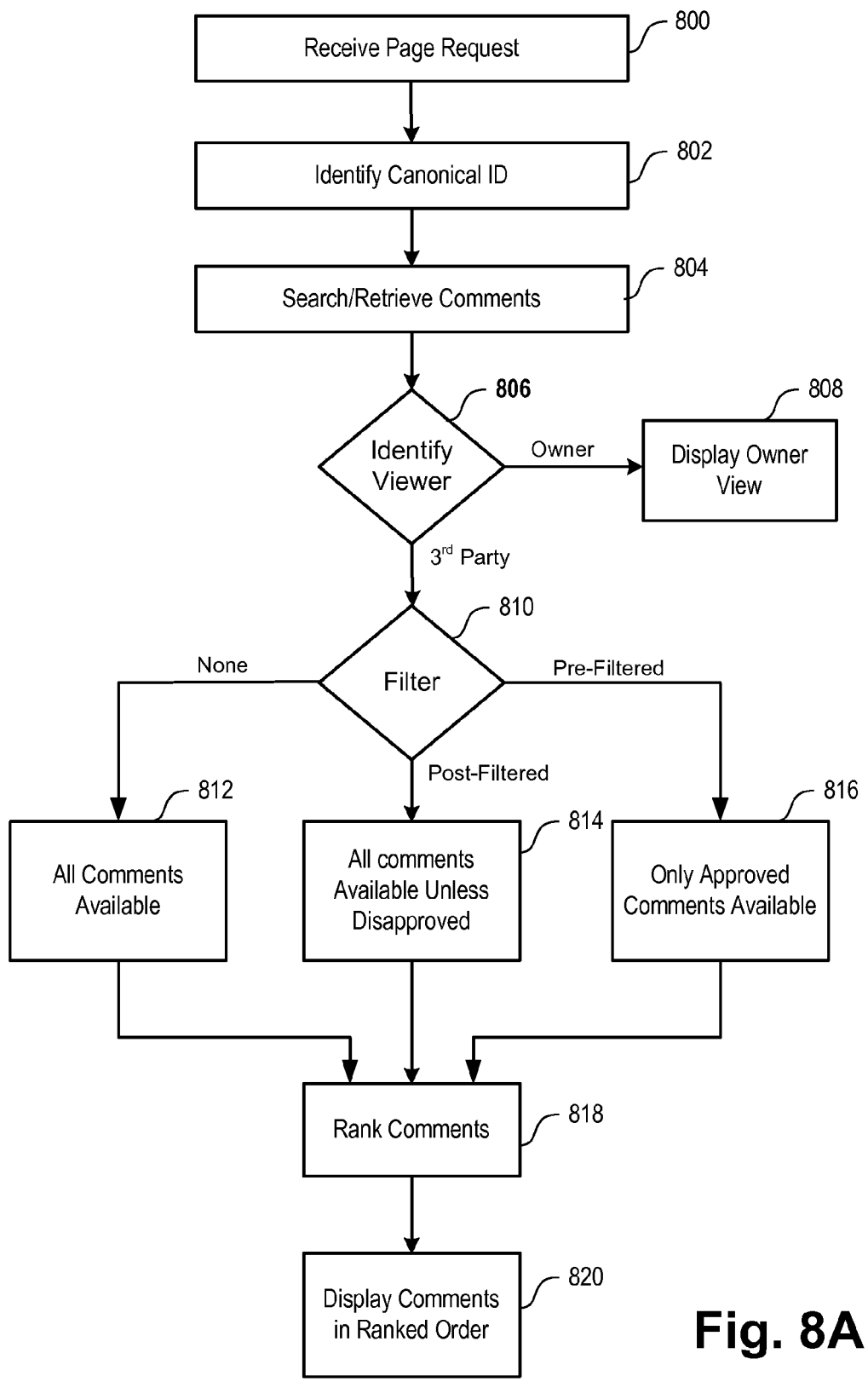
FIG. 8A illustrates a method for handling the display of comments on a page, in accordance with implementations of the disclosure.

FIG. 8A illustrates a method for handling the display of comments on a page. At method operation 800, a page request is received. At method operation 802, a canonical ID is determined for the requested page. At method operation 804, a search is conducted for comments which have been tagged with the canonical ID, and these comments are retrieved for possible display. At method operation 806, characteristics of the viewer are identified. For example, if it is determined that the viewer is an owner of the requested page, then at method operation 808, an owner's view is displayed to the user. The owner's view can be similar to that described with reference to FIG. 7A or 7B, providing the owner with privileged features including the ability to approve comments for display or delete comments.

With continued reference to FIG. 8A, at operation 806, if it is determined that the viewer is a third party, then at operation 810, a filtering is applied to the retrieved comments based on predefined settings which have been set for the page. If no filtering is to be applied, then at operation 812, all retrieved comments are made available for display. If post-filtering is applied, then at operation 814, all comments are made available for display unless they have been disapproved by the page owner. And if pre-filtering is applied, then at operation 816, only those comments which have been positively approved by the owner are made available for display.

At operation 818, the comments which are available for display are ranked based on various factors, including characteristics of the viewer, characteristics of the authors of the comments, and characteristics of the comments. By way of example, these may include various specific factors, including: recency of a comment, ratings of a comment, responses to a comment, length of a comment, keywords found in comment, geographic location of the viewer, geographic location of a comment author, whether or not a comment author is in a social graph of the viewer, etc. Various weights can be applied to the various factors to produce an overall score for each available comment. The available comments may thus be ranked based on their overall scores. At operation 820, the comments are displayed on the requested page based on their ranked order.

Figure 8B:
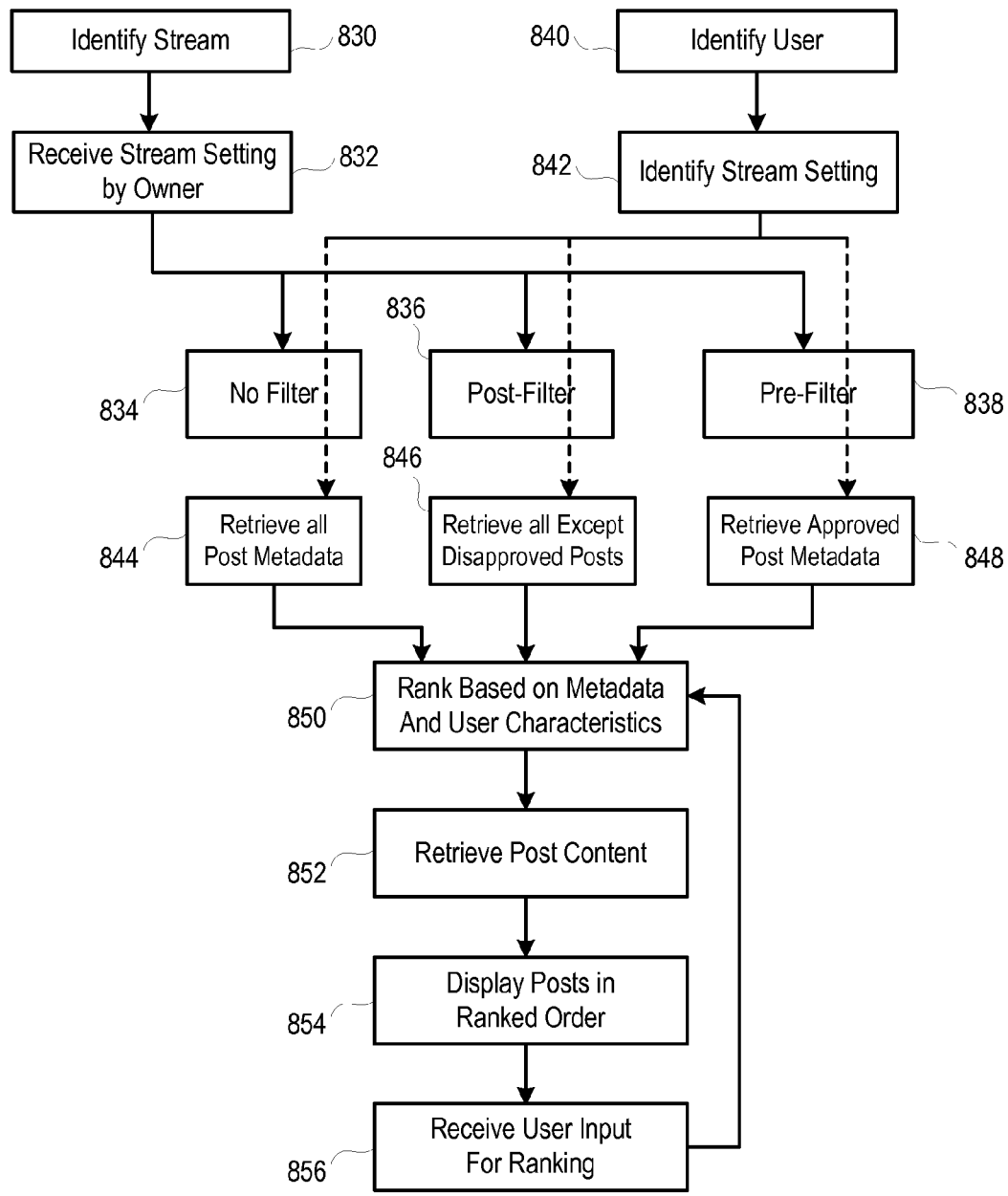
FIG. 8B illustrates a method for displaying posts on an owner's page based on predefined moderation settings, in accordance with implementations of the disclosure.

FIG. 8B illustrates a method for displaying posts on an owner's page based on predefined moderation settings, in accordance with an implementation of the disclosure. At operation 830, a stream of post data items associated with a content item is identified. The stream of post data items is typically presented on a web page in conjunction with the content item. An owner of the web page is able to moderate the display of post data items in the stream in accordance with methods described herein. At operation 832, a moderation setting is defined by the owner for the stream. Three choices are provided for the owner in this regard: (1) no filtering (reference 834), in which post data items, e.g., all post data items, are available for display in the stream; (2) post-filtering (reference 836), in which post data items are available for display in the stream unless the owner indicates otherwise through a disapproval/deletion mechanism; or (3) pre-filtering (reference 838), in which the owner approves post data items that are available for display in the stream.

At operation 840, a user accessing the owner's page is identified. Identification of the user may be facilitated via various systems for which the user logs in to establish their identity, e.g. a website which includes the owner's page, a social network, an e-mail service, etc. At operation 842, the setting for the stream shown on the owner's page is determined. As noted above, the stream can be configured to have no filtering, post-filtering, or pre-filtering applied. If no filtering is applied, then at operation 844, the metadata for all posts is retrieved for consideration. If the stream is configured to be post-filtered, then at operation 846, metadata for all posts except those which have been expressly disapproved by the owner is retrieved for consideration. If the stream is configured to be pre-filtered, then at operation 848, the metadata for posts which have been expressly approved by the owner is retrieved.

At operation 850, the posts are ranked based on the retrieved post metadata and characteristics of the user. It will be appreciated that the post metadata for a given post may include any of various kinds of information about the post, e.g. date/time of creation, author's user ID, indications of approval by other users (likes, +1's, thumbs up, etc.), inclusion of links or other content items, or any other information which may be relevant for ranking purposes. The characteristics of the user can include any of various information that be determined about a given user, e.g. geographic location, social graph data, etc. The post metadata can be considered in combination with the user characteristics. For example, posts that are authored by or which have received an indication of approval by others in the user's social graph may be prioritized for display to the user. It will be appreciated that consideration of factors based on the post metadata and user characteristics can be based on a weighted scoring system, with various weights applied to the various factors under consideration, so as to yield an overall score for each post. The ranking of the posts can then be based on the overall score for each of the posts.

At operation 852, the post content (e.g. text and content items included in the post) for the posts to be displayed is retrieved. At operation 854, the posts are displayed in accordance with their ranking. Optionally, at operation 856, the user may provide input which affects the ranking, e.g. requesting sorting of the posts according to a specific sorting profile.

Figure 9:
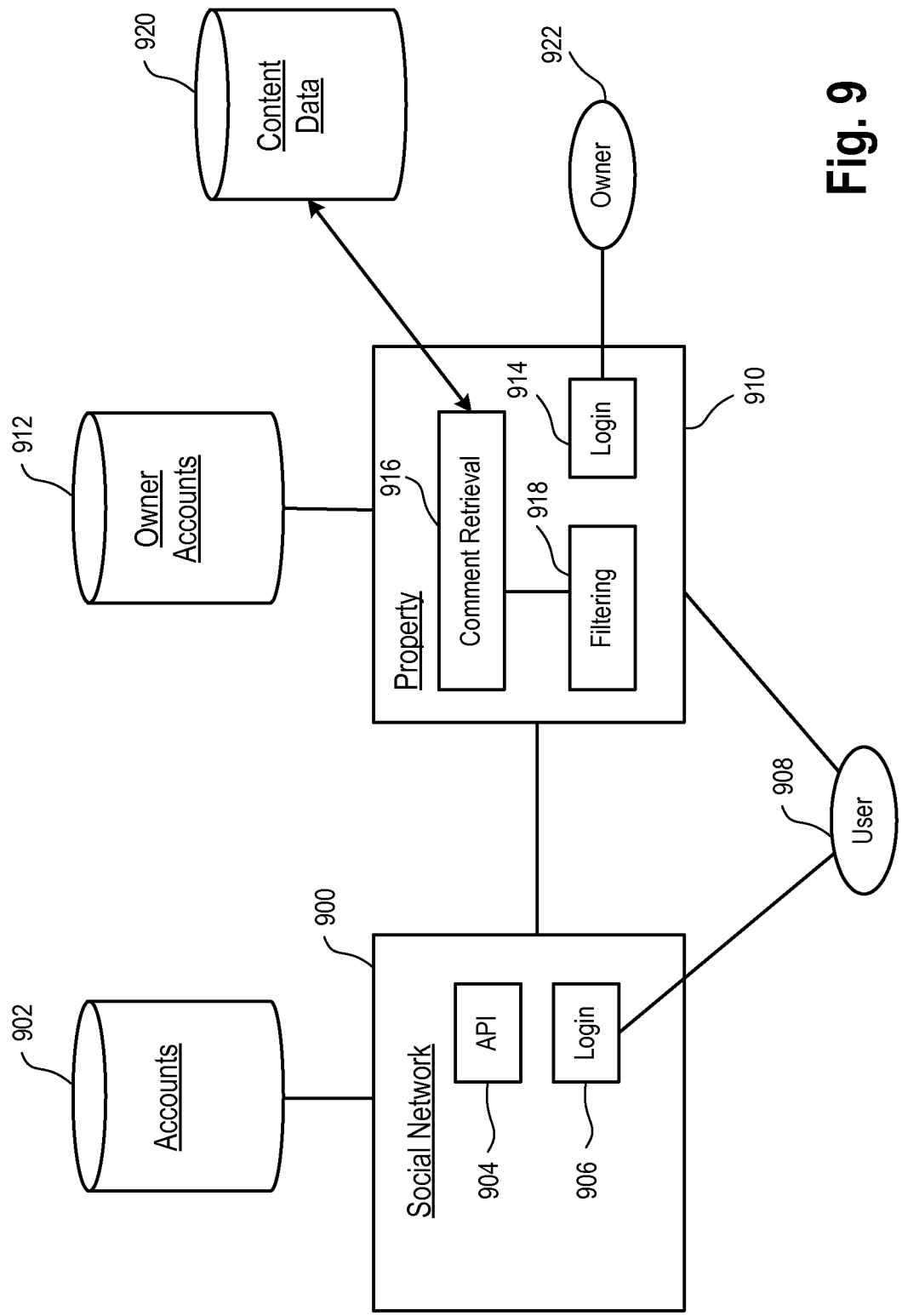
FIG. 9 illustrates a system for filtering the display of comments on a property webpage, based in part on social network data, in accordance with implementations of the disclosure.

FIG. 9 illustrates a system for filtering the display of comments on a property webpage, based in part on social network data. A social network server 900 accesses data from an accounts storage 902 containing user data on the social network. An API 904 is provided, by which social network data can be requested and accessed. A login module 906 logs the user 908 into the social network.

The property server 910 includes a login module 914 for logging in users. Owner account information is stored in owner accounts storage 912. For example, an owner 922 is shown logging on to the property. The property server 910 hosts a webpage requested by the user 908. In response to the request for the webpage, comments retrieval module 916 retrieves relevant comments from the content data storage 920. A filtering module 918 filters the comments according to various criteria, as has been discussed above. The filtering process can include accessing the API 904 of the social network to retrieve social graph data of the user 908, as well as social graph data of authors of comments.

Figure 10:
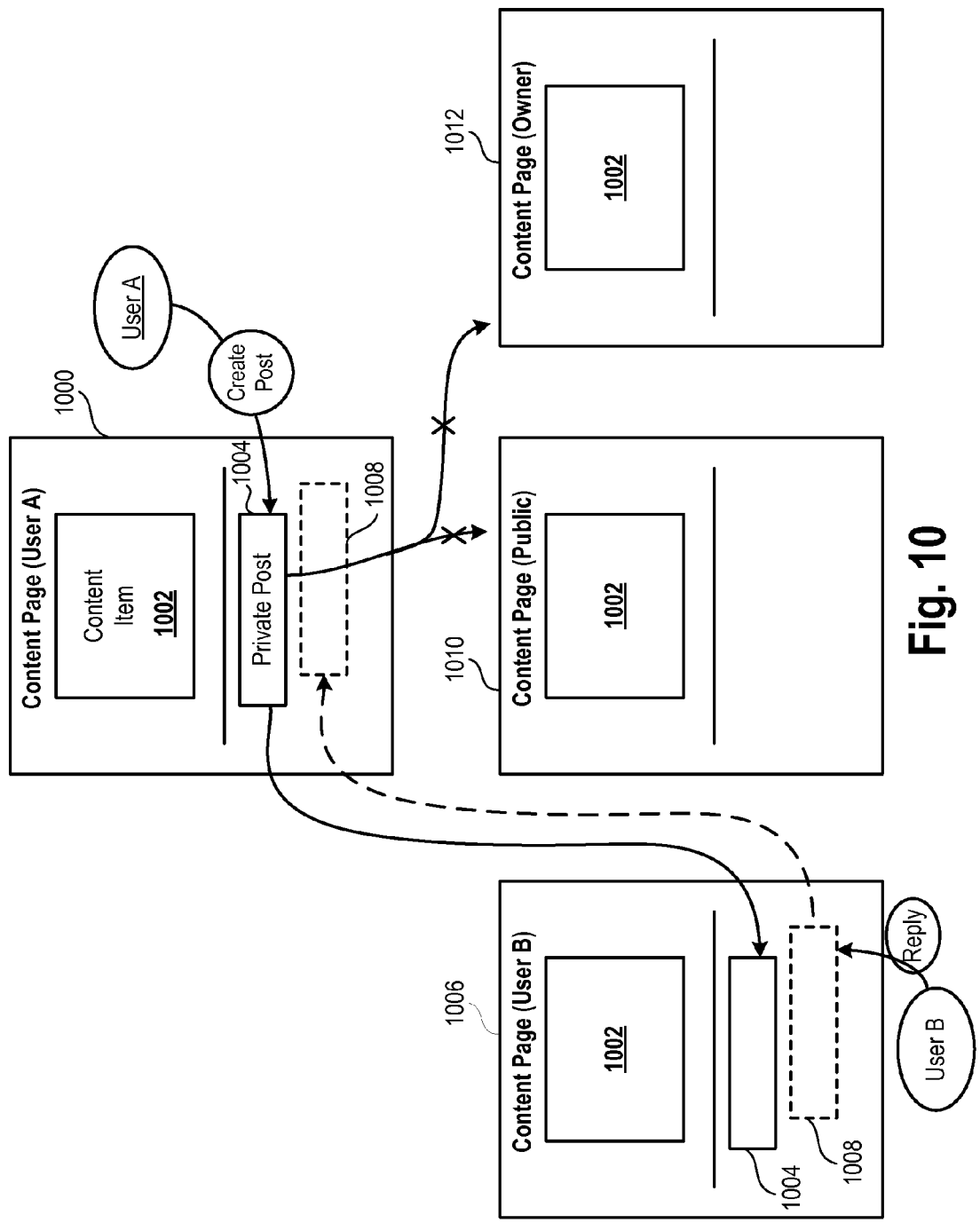
FIG. 10 conceptually illustrates the display of a private post based on the user viewing a content page, in accordance with implementations of the disclosure.

FIG. 10 conceptually illustrates the display of a private post based on the user viewing a content page, in accordance with implementations of the disclosure. A content page 1000 is shown as viewed by a user A who is logged in. The content page 1000 includes a content item 1002. The user A creates a new post 1004 that is private (or not designated as public) and shared with users who are connected to user A in some fashion, e.g. users who are part of user A's social graph or part of a subgroup of users in user A's social graph. In the illustrated embodiment, user B is part of user A's social graph. Hence, when user B is logged in and views the same content page, then the content page 1006 presented to user B includes access to the private post 1004 created by user A. User B may choose to reply to user A's post 1004, and therefore generate a reply post 1008. This reply post can be displayed on the content page 1000 presented to user A, as user A is part of user B's social graph.

However, because the post 1004 is not a public post, but a private post shared with a limited group of users, the post 1004 is not viewable in the public view of the content page (no user logged in), as shown at reference 1010. The private post 1004 would also not be available for display to another logged in user who is not part of the group of users with whom the post 1004 was shared. Moreover, the post 1004 is also not available for viewing when the owner is logged in to the content page, as shown at reference 1012.

Figure 11:
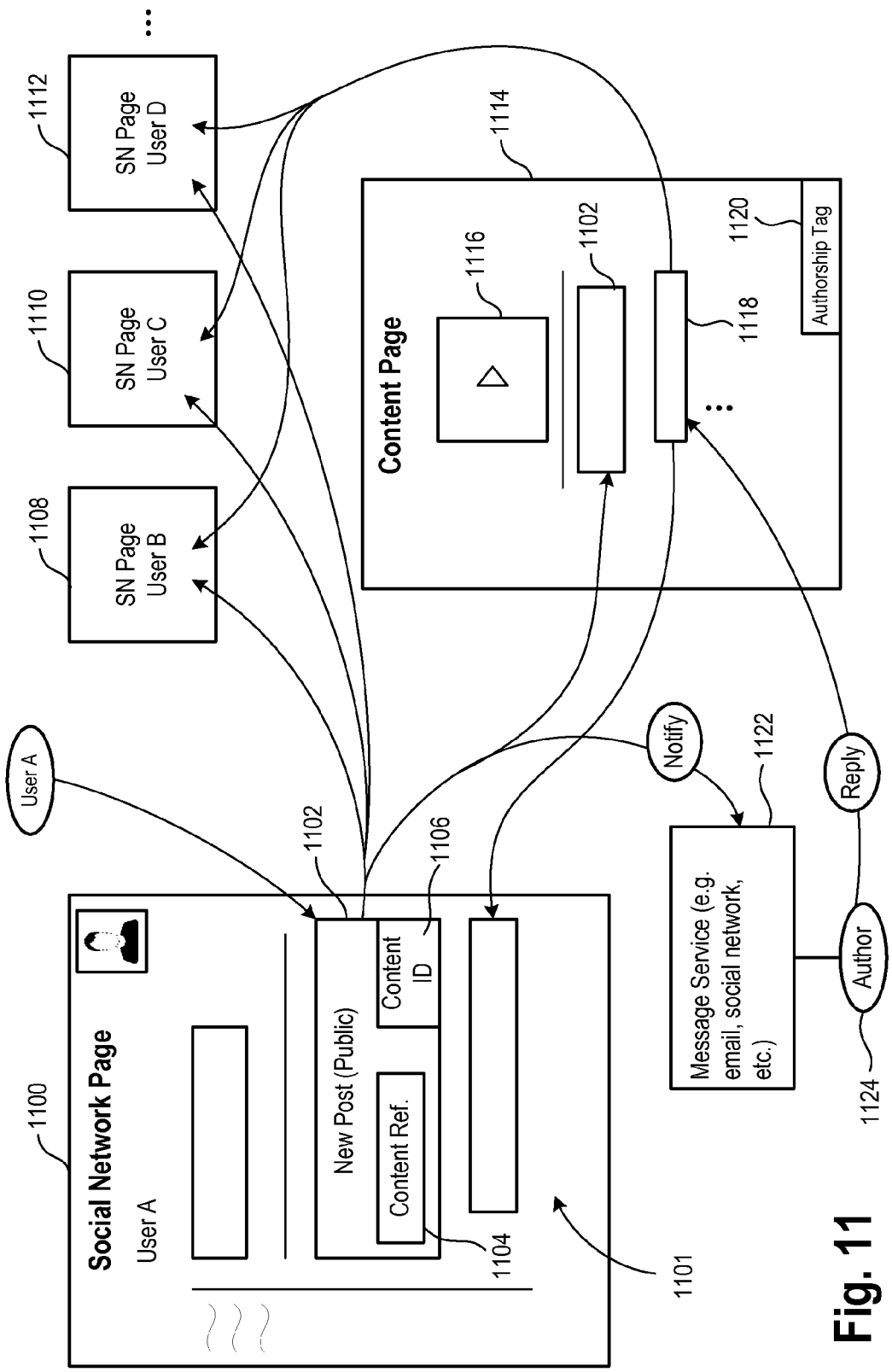
FIG. 11 conceptually illustrates the posting of a public post to a social network, in accordance with implementations of the disclosure.

FIG. 11 conceptually illustrates the posting of a public post to a social network, in accordance with implementations of the disclosure. A social network page 1100 of a user A is shown. The user A generates a new public post 1102 and shares it with users B, C, and D. The post 1102 includes a reference 1104 to content on a content page 1114 that is created or owned by an author 1124, and is also tagged with a content ID based on identification of the content reference 1104. The post 1102 is displayed in the personal social network feed or stream 1101 of user A, and also in those of users B, C, and D, with whom the post 1102 has been shared. Thus, the post 1102 appears on the social network pages 1108, 1110, and 1112 of users B, C, and D, respectively.

As the post 1102 is a public post, it may also be available for display on the author's 1124 content page 1114, provided the content page 1114 includes an active stream for displaying posts. The content page 1114 includes an authorship tag 1120 that identifies the author 1124 as the author of the content page 1114. Based on identification of the author 1124 according to the authorship tag 1120, a notification can be sent to the author 1124, informing the author of the creation of the posting 1102. The authorship tag can include any of various kinds of information facilitating notification of the author, e.g. an e-mail address, a phone number, a network address or domain, a username (e.g. a social network username, messenger service username, chat service username, or username on another type of property), or any other type of information specifying a destination for a notification or providing information from which a notification may otherwise be generated.

In accordance with the present disclosure, the author 1124 can be notified when a public posting is generated that is about the author's content. The notification can occur via a messaging service 1122, e.g. an e-mail service, a social network, a mobile messaging service, a private message service of a website, etc. By notifying the author of a public post that is about their content, the author is afforded the opportunity to moderate the post if it may appear in a stream on the author's page, and also the opportunity to reply to the post and thus participate in the conversation about their content that is occurring in the context of the post. In the illustrated implementation, the author 1124 is notified of the post 1102 which appears on the author's content page 1114. The author 1124 responds to the post 1102 by posting a reply post 1118 on the content page 1114, the reply post 1118 being also propagated to the stream 1101 of the social network page 1100 of the user A, as well as those of the users B, C, and D.

It should be appreciated that an author may also be referred to as an owner or other designated title to whom content can be attributed, and such can be not just a person, but a group, organization, or any other type of entity that may be attributed with authorship or ownership of content. Identification of an author or owner for purposes of the present disclosure may not necessarily require identification of an actual person or entity's proper name, but may simply entail determination of identifying information that attributes the content or page to a known person or entity, and which may be used to notify said person or entity that a post has been generated about their content/page. Additionally, it will be appreciated that there may be a plurality of authors or owners associated with a given content item. In various implementations, some or all of the authors/owners can be notified, conditional upon preferences defined individually or collectively.

Implementations of the present disclosure provide for the owner of content or a content page to be notified when a post is generated about their content. It should be appreciated that the location of the post and the location of the content can be on unrelated properties, e.g. on different web pages that do not share a common domain, on different networks, different web sites, etc. In some implementations, the post is generated on a social network, whereas the content is located on a content web site that does not share a common domain with the social network.

Figure 12:
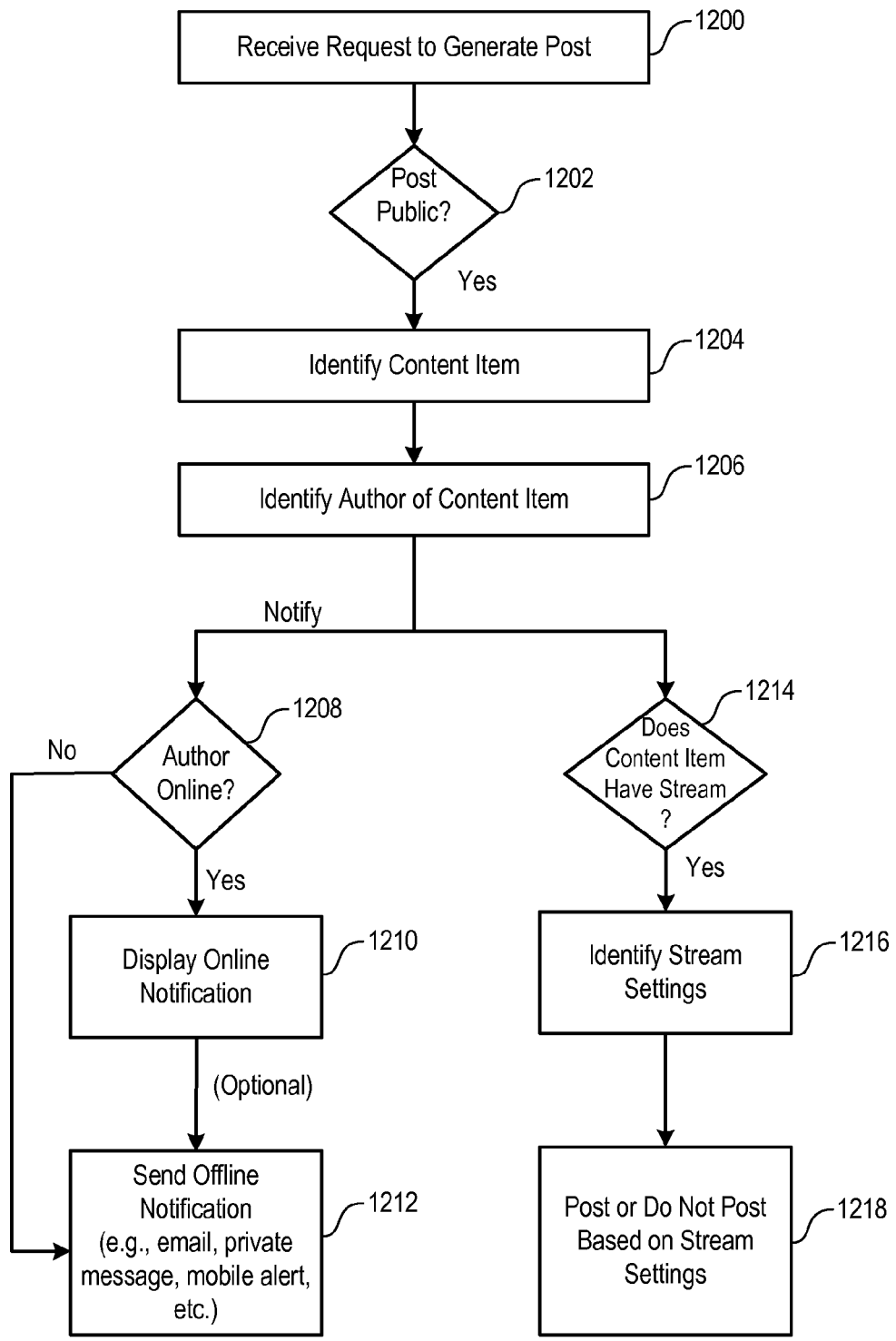
FIG. 12 illustrates a method for notifying an author of a new post relating to their content item, and for displaying the new post as part of the content item's posting stream, in accordance with implementations of the disclosure.

FIG. 12 illustrates a method for notifying an author of a new post relating to their content item, and for displaying the new post as part of the content item's posting stream. At operation 1200, a request is received to generate a new post. The new post can include a content item or a reference to the content item or a page including the content item, as well as other post content. At operation 1202, it is determined whether the post is a public post or not. If so, then at operation 1204, the post content is analyzed to identify the content item. At operation 1206, the author of the content item is identified. In some implementations, the author can be identified through detection of an authorship tag associated with the content item or page which includes the content item.

At operation 1208, it is determined whether the author is currently online. The online availability of the author may be determined based on checking the login status of the author on a relevant system, e.g. social network, content website, or other website. If the author is determined to be online, then at operation 1210, an online notification is displayed to the author. For example, a pop-up display, an alert bar, or some other type of visual notification mechanism may be displayed to the author during the author's online session on the social network or website. The notification may also include playback of an audio alert sound. The notification alerts the author to the fact of a new public post having been generated which relates to the author's content. In addition to the online notification, at operation 1212, an offline notification may be sent to the user, e.g. an e-mail, private message, mobile alert, etc. It will be appreciated that if at operation 1208 the author is determined not to be online, then at operation 1212, the offline notification is sent. As with the online notification, the offline notification provides information regarding the newly generated post that relates to the author's content.

In some implementations, notifications (both online and offline) can include interactive elements in addition to alerting the author about a new post. For example, a notification may include a preview of the post's content, along with selectable options for approving or disapproving the post. In some implementations, the notification includes a link for navigating to a management page through which the author may moderate the post. The notification may also include a link to the original context of the post, e.g. to the social network page of a user who first posted the comment to their social network stream.

Figure 13:
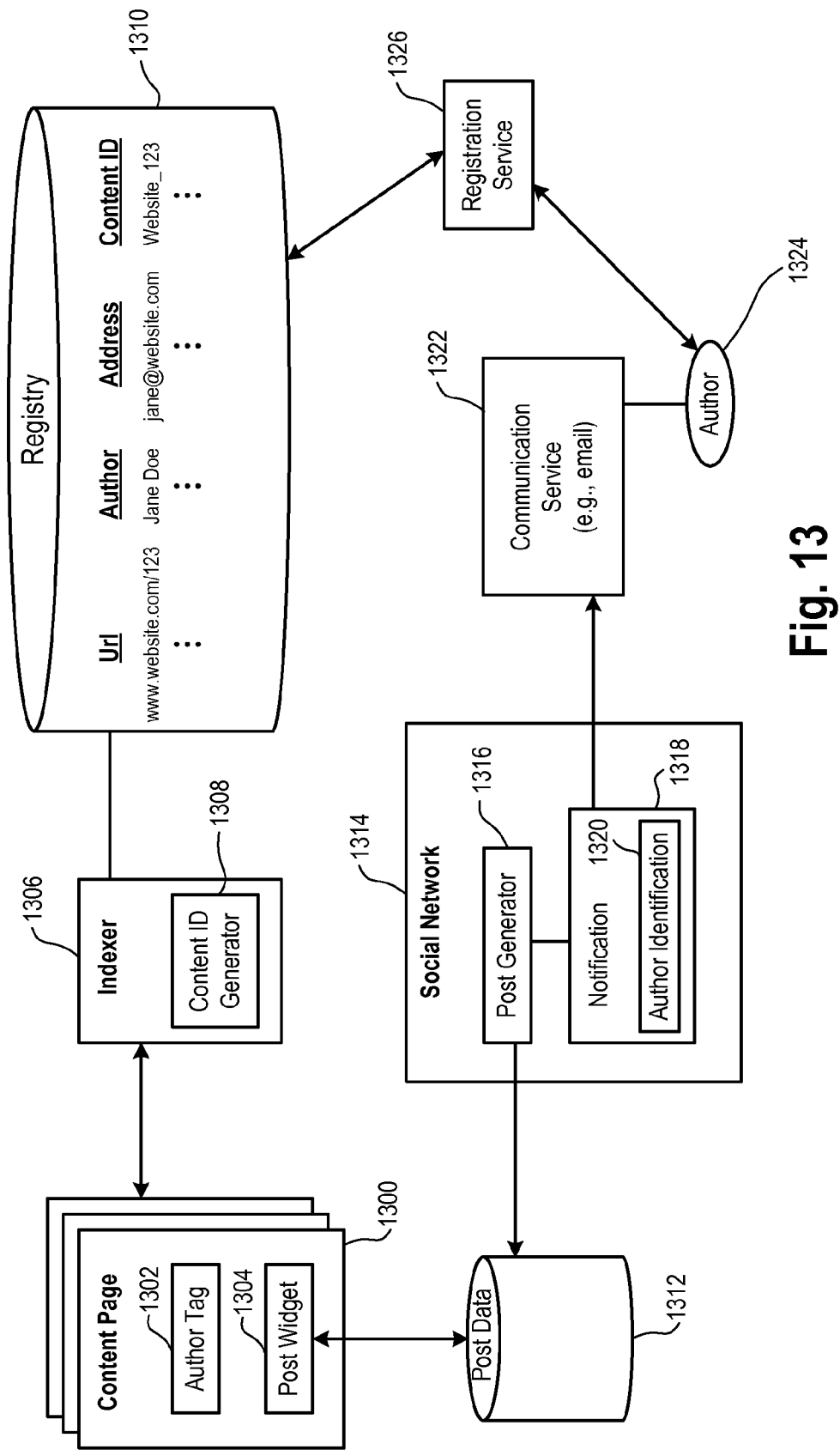
FIG. 13 illustrates a system for notifying an author of a newly generated post which references or includes content of the author, in accordance with implementations of the disclosure.

FIG. 13 illustrates a system for notifying an author of a newly generated post which references or includes content of the author. Various content pages 1300 are shown which contain content that may be included or otherwise referenced in posts. A given content page can include an authorship tag 1302 which identifies an author of the content page. A given content page may also include a post widget 1304 configured to manage the display of posts on the content page as well as provide a mechanism for creating new posts. An indexer 1306 indexes the content pages, storing information to a registry 1310. For a given content page, the indexer 1306 may store various kinds of information, including the URL of the content page, an identified author associated with the content page, an address for notification of the author (e.g. based on reading the authorship tag 1302 of the content page), and a content ID that can be utilized to tag a post which includes a reference to the content page. A content ID generator 1308 generates the content ID for a given content page.

A post data storage 1312 stores data defining posts. As noted, posts can be generated from a post widget included in a content page. Posts may also be generated from a social network 1314, which includes a post generator 1316 for generating new posts. A notification module 1318 is configured to include an author identification module 1320 for identifying an author of a content page referenced by a post. Based on identification of the author, the notification module 1318 activates either or both of an online notification mechanism if the author is online, and an offline notification mechanism, e.g. accessing a communication service 1322 to send a message to the author 1324. The post widget 1304 can be similarly configured to provide for notification of an author of content referenced by a post.

In various implementations, the identification module 1318 can be configured to determine authorship in various ways. For example, as has been described, authorship can be determined by accessing and reading a file referenced by the post to identify an authorship tag that identifies the author and provides information relevant to facilitate notification of the author. In another implementation, authors or owners of content can register their content via a registration service 1326. The registration service 1326 allows content owners to associate ownership and contact information (e.g. e-mail address, phone number, username, etc.) with a reference to their content in the registry 1310. The identification module 1318 reads the relevant ownership and contact information from the registry 1310 for a given content item, and this information is utilized by the notification module 1318 to trigger sending of a notification to the identified owner of the content.

Figure 14:
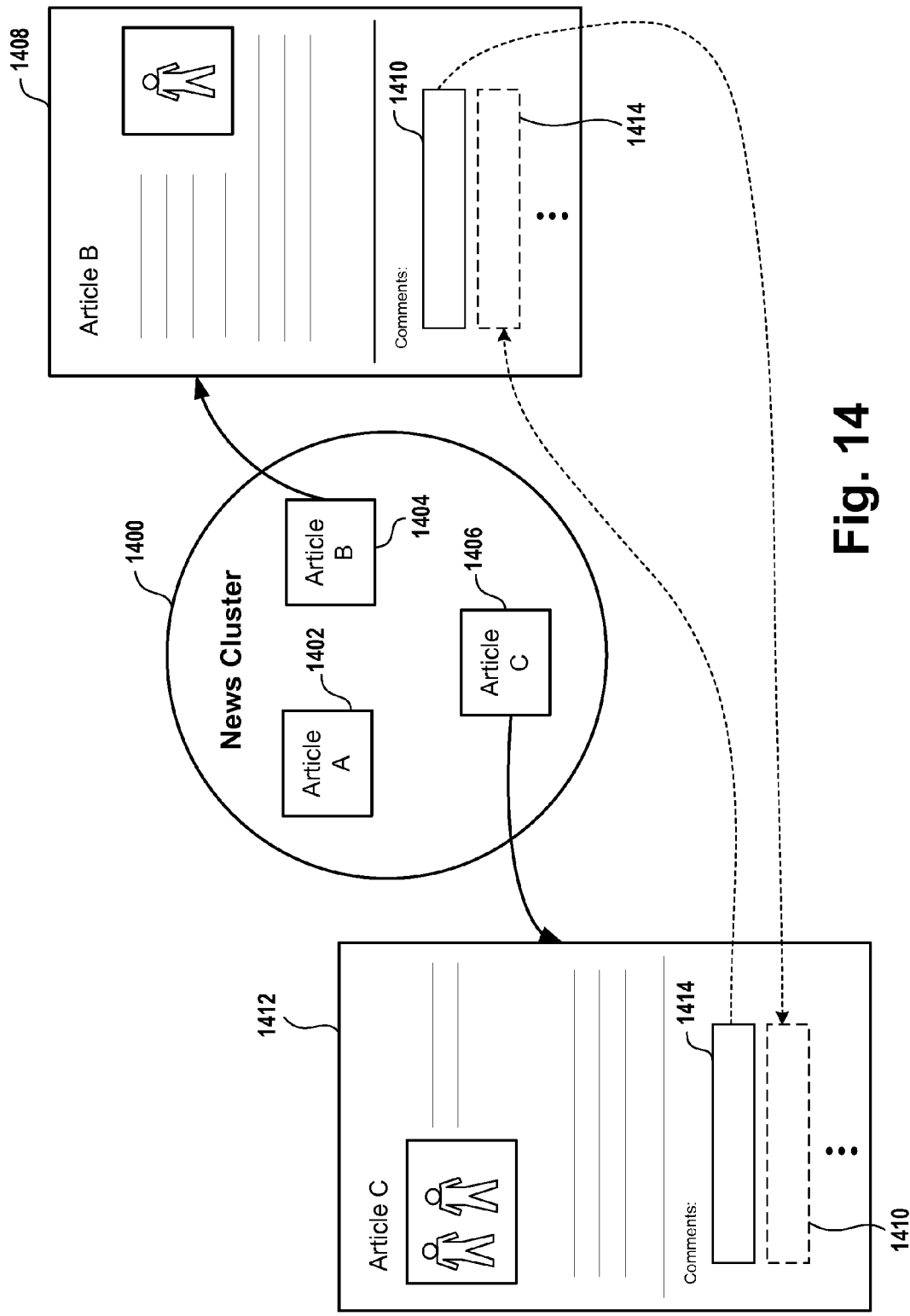
FIG. 14 illustrates a flow of comments amongst a news cluster, in accordance with implementations of the disclosure.

FIG. 14 illustrates a flow of comments amongst a news cluster. A news cluster 1400 is defined to include a number of news articles 1402, 1404, and 1406, each of which relates to the same topic. The particular news articles which are included in the new cluster can be determined based on analysis of the content of various news articles to, for example, identify keywords, image content, etc. In some implementations, a level of similarity between news articles is determined, and those news articles having a level of similarity above a predefined threshold are included in a common news cluster.

In the illustrated implementation, the article 1404 is presented on a page 1408 with user-generated comments displayed below the article. A comment 1410 is generated by a user in response to the article. However, as the article 1404 is part of the same news cluster as article 1406, the comment 1410, in accordance with mechanisms described herein, can appear in the comments section that is displayed when the article 1406 is presented on a page 1412. Similarly, a comment 1414 that is generated in response to the article 1406 on the page 1412, may appear in the comments section of the page 1408.

The articles 1402, 1404, and 1406 are different from each other. But because they have been identified as part of the same news cluster, comments relating to the articles may be tagged with a common identifier. Then when one of the articles is displayed, a search can be performed for comments which have been tagged with the common identifier, thereby retrieving comments which have been generated for any of the articles in the news cluster. In this manner, comments from any of the articles in the news cluster are made available for display when one of the news articles is presented on a page.

Figure 15:
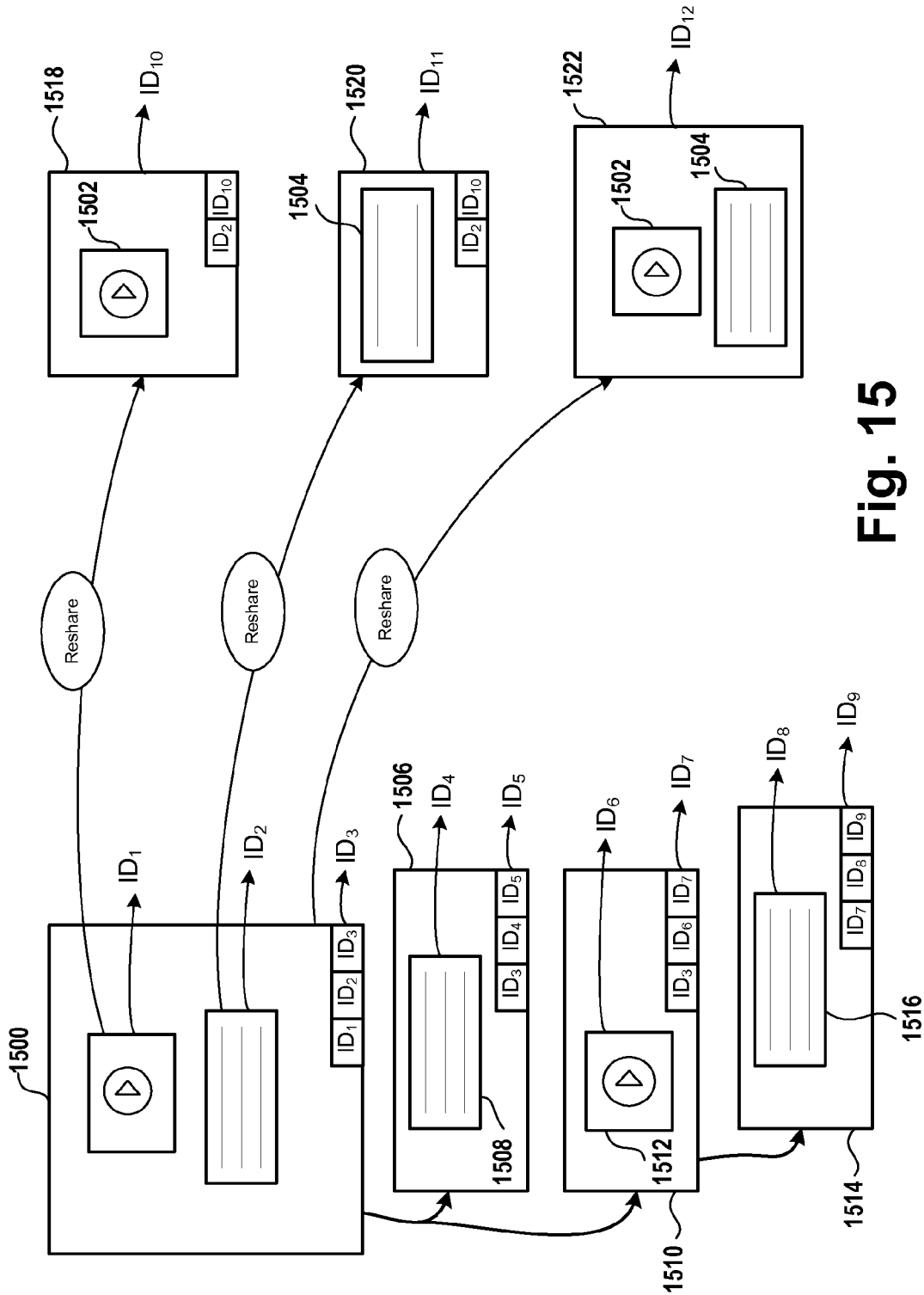
FIG. 15 illustrates various identifiers defined for objects relating to posts, in accordance with implementations of the disclosure.

FIG. 15 illustrates various identifiers defined for objects relating to posts, in accordance with implementations of the disclosure. A post 1500 is defined to include a content item 1502 (e.g. a video) and text 1504. For each of these items, a unique ID can be determined. For example, the content item 1502 can have an ID1, the text 1504 an ID2, and the post 1500 an ID3. The post 1500 can be tagged with each of these ID's, i.e. post 1500 is tagged with ID1, ID2, and ID3.

One response to post 1500 is a post 1506, which includes text 1508. The text 1508 can be assigned an ID4, and the post 1506 assigned an ID5. The post 1506 can thus be tagged with ID3 (the ID of the post to which post 1506 responds) as well as ID4 and ID5.

Another response to post 1500 is a post 1510, which includes a content item 1512. The content item 1512 can be assigned an ID6 and the post 1510 assigned an ID7. The post 1510 can be tagged with the ID3 (the ID of the post to which post 1510 responds, as well as ID6 and ID7.

A response to the post 1510 is a post 1514, which includes text 1516. The text 1516 is given ID8 and the post 1514 is given ID9, so that the post 1514 is tagged with ID7 (the ID of the post to which post 1514 responds) and ID8 and ID9.

One may reshare a post or portions thereof. For example, a post 1518 reshares the content item 1502, but not the text 1504 of post 1500. The post 1518 is given an ID10. The post 1518 is therefore tagged with the ID1 (ID of the content item 1502 being reshared) and ID10.

A post 1520 reshares the text 1504 but not the content item 1502 of the post 1500. The post 1520 is given an ID11. The post 1520 is thus tagged with ID2 (the ID of the text 1504 being reshared) and the ID11.

A post 1522 reshares the post 1500 in its entirety. The post 1522 thus includes the content item 1502 and the text 1504. The post 1522 is given ID12. The post 1522 is tagged with ID3 (the ID of the post 1500 being reshared, and the ID12.

It should be appreciated that a reshare of a post may occur when a user endorses or indicates approval of the post, e.g. by selecting a button to indicate that they "like" or "+1" the post, give it thumbs up, etc. The endorsement action can be shared to the user's social graph, and may appear in their stream of posts as a new post indicating that the user approved or endorsed the earlier post. The new post may contain some or all of the earlier post or a link to the earlier post, and thereby functions to reshare the earlier post.

As posts are tagged with various ID's, searches can be conducted based on the tags to retrieve posts which relate to a particular content item, text, or post.

Figure 16:
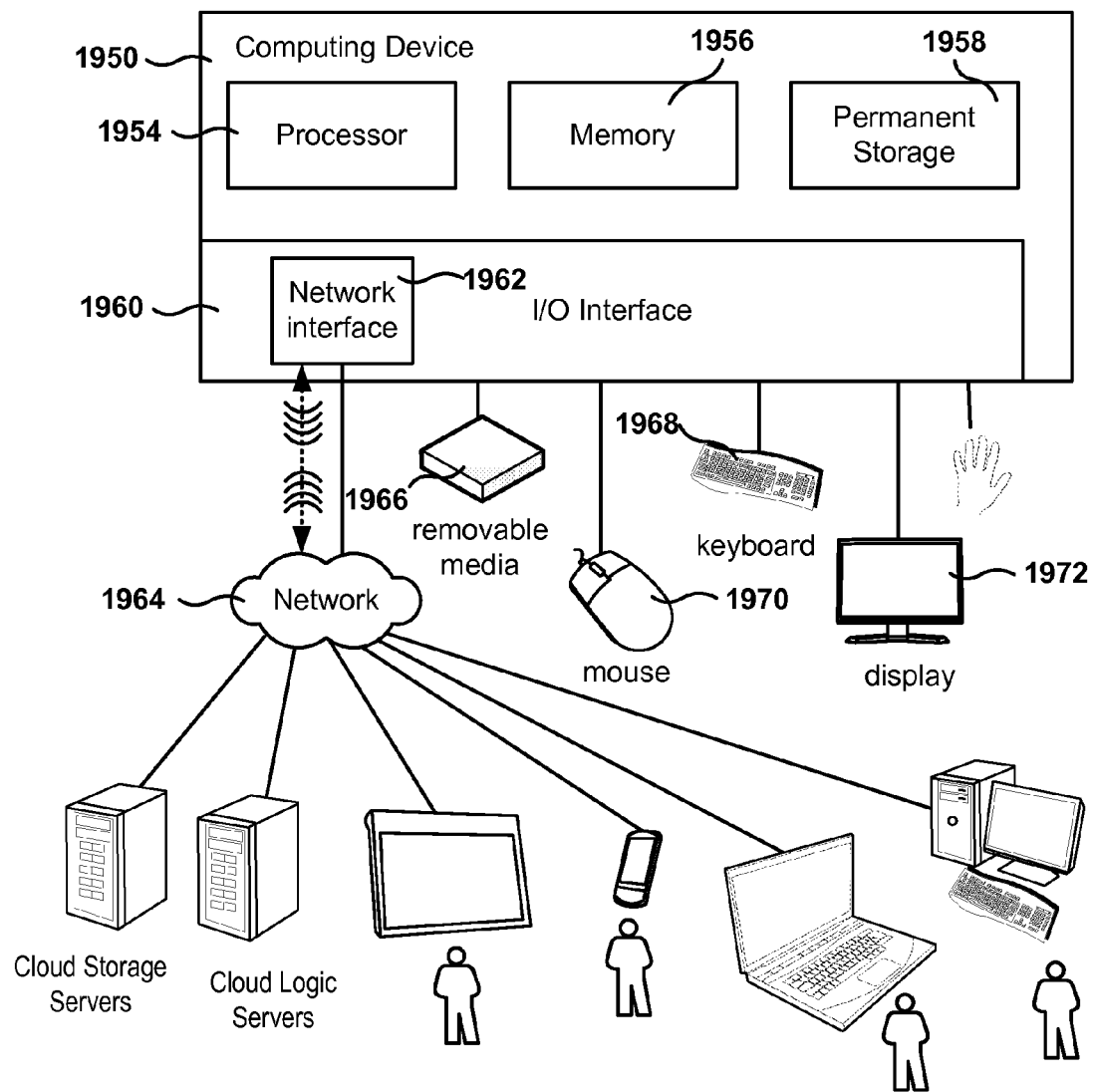
FIG. 16 is a schematic diagram of a computer system for implementing implementations of the present disclosure.

FIG. 16 is a schematic diagram of a computer system for implementing implementations of the present disclosure. It should be appreciated that the methods described herein may be performed with a digital processing system, which in one implementation may be a conventional, general-purpose computer system. Special purpose computers, which are designed or programmed to perform only one function, may be used in the alternative. The computing device 1950 includes a processor 1954, which is coupled through a bus to memory 1956, permanent storage 1958, and Input/Output (I/O) interface 1960.

Permanent storage 1958 represents a persistent data storage device, e.g., a hard drive or a USB drive, which may be local or remote. Network interface 1962 provides connections via network 1964, allowing communications (wired or wireless) with other devices. It should be appreciated that processor 1954 may be embodied in a general-purpose processor, a special purpose processor, or a specially programmed logic device. Input/Output (I/O) interface 1960 provides communication with different peripherals and is connected with processor 1954, memory 1956, and permanent storage 1958, through the bus. Sample peripherals include display 1972, keyboard 1968, mouse 1970, removable media device 1966, etc.

Display 1972 is configured to display the user interfaces described herein. Keyboard 1968, mouse 1970, removable media device 1966, and other peripherals are coupled to I/O interface 1960 in order to exchange information with processor 1954. It should be appreciated that data to and from external devices may be communicated through I/O interface 1960. Implementations of the disclosure can also be practiced in distributed computing environments where tasks are performed by remote processing devices that are linked through a wired or a wireless network.

Implementations of the present disclosure can be fabricated as computer readable code on a non-transitory computer readable storage medium. The non-transitory computer readable storage medium holds data which can be read by a computer system. Examples of the non-transitory computer readable storage medium include permanent storage 1958, network attached storage (NAS), read-only memory or random-access memory in memory module 1956, Compact Discs (CD), Blu-Ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Implementations presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 1964. Network 1964 can be, for example, the Internet. The Internet is interconnected with a plurality of devices, including cloud storage servers, cloud logic servers, user interface devices, etc. Some devices that can communicate with the Internet access services on various cloud logic servers and cloud storage can include, e.g., tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware implementations, and code are configured for enabling the interfacing and interaction with the social network, and the users of the social network, and users on various websites connected to the Internet. The interaction, through social networks will enable electronic messaging regarding current information, shared interests, chat communication, video communication, and general posting, interests, and relationship management. Broadly speaking, a social network is a site that allows at least two people or entities to communicate with one another and share at least one piece of data.

Although the foregoing implementations have been described with a certain level of detail for purposes of clarity, it is noted that certain changes and modifications can be practiced within the scope of the appended claims. Accordingly, the provided implementations are to be considered illustrative and not restrictive, not limited by the details presented herein, and may be modified within the scope and equivalents of the appended claims.

What is claimed is:

1. A method, comprising:
   receiving a request to generate a first post data item for display at a first location, the first post data item including a reference corresponding to a link to a content item located at a second location;
   determining, based on the reference to the content item, a content identifier associated with the content item;
   associating the content identifier with the post data item;
   retrieving, by a processor, one or more additional post data items based on the content identifier, wherein each of the one or more additional post data items includes another reference corresponding to a same link to the content item at the second location; and
   providing the first post data item and the one or more additional post data items at the second location in an order that is based on whether an author of the first post data item or one or more additional authors of the one or more additional post data items are in a social graph of a viewer associated with the second location.

2. The method of claim 1, wherein retrieving the one or more additional post data items includes searching a plurality of post data items to identify post data items that are associated with the content identifier.

3. The method of claim 1, wherein determining the content identifier includes performing a look-up of the reference to the content item to identify a corresponding canonical ID.

4. The method of claim 1, wherein the reference to the content item is a uniform resource locator (URL) of the content item, and wherein the content identifier is a data string.

5. The method of claim 1, wherein the content identifier associated with the content item is a URL of the content item.

6. The method of claim 1, wherein the content item is selected from at least one of a video, an article, an image, an audio file, a text item, a web page, a collection of web pages, or a combination of any two or more thereof.

7. The method of claim 1, wherein retrieving the one or more additional post data items and providing the one or more additional post data items is in response to a request to access the second location.

8. The method of claim 7, further comprising:
   accessing a social graph of a first user who generated the request to access the second location; and
   prioritizing the providing of selected ones of the retrieved one or more additional post data items which were generated by secondary users within the social graph of the first user.

9. The method of claim 1, further comprising:
   setting an approval status of a new post data item for display at the second location, wherein retrieving the one or more additional post data items includes identifying the approval status of the one or more additional post data items.

10. The method of claim 1, wherein the first location is defined by a first web page, and wherein the second location is defined by a second web page.

11. A method, comprising:
    receiving a request to generate a first post data item for display in association with a first content item, wherein the first post data item includes a reference corresponding to a link to the first content item;
    determining a content identifier associated with the first content item, the content identifier also being associated with a second content item;
    associating the content identifier with the post data item;
    in response to a request to access the second content item, retrieving, by a processor, one or more additional post data items based on the content identifier, wherein each of the one or more additional post data items includes another reference corresponding to the link to the first content item or another link to the second content item; and providing the one or more additional post data items and the first post data item in association with the second content item in an order that is based on whether an author of the first post data item or one or more additional authors of the one or more additional post data items are in a social graph of a viewer associated with the second content item.

12. The method of claim 11, wherein retrieving the one or more additional post data items includes searching a plurality of post data items to identify post data items that are associated with the content identifier.

13. The method of claim 11, wherein determining the content identifier includes identifying a canonical ID associated with the first content item.

14. The method of claim 11, wherein the content identifier is a data string.

15. The method of claim 11, wherein the content identifier is a URL.

16. The method of claim 11, wherein the first content item or the second content item is selected from at least one of a video, an article, an image, an audio file, a text item, or a combination of any two or more thereof.

17. The method of claim 11, further comprising,
accessing a social graph of a first user who generated the request to access the second content item; and
prioritizing the providing of selected ones of the retrieved one or more additional post data items which were generated by secondary users within the social graph of the first user.

18. The method of claim 11, further comprising,
setting an approval status of the first post data item for display in association with the second content item, wherein retrieving the one or more additional post data items includes identifying the approval status of the one or more additional post data items.

19. The method of claim 11, wherein the first content item is defined on a first web page, and wherein the second content item is defined on a second web page.

20. A non-transitory computer readable medium having instructions, which when executed by a processor, cause the processor to perform operations comprising:

receiving a request to generate a first post data item for display at a first location, the first post data item including a reference corresponding to a link to a content item located at a second location;

determining, based on the reference to the content item, a content identifier associated with the content item;

associating the content identifier with the post data item;

retrieving one or more additional post data items based on the content identifier, wherein each of the one or more additional post data items includes another reference corresponding to a same link to the content item at the second location; and providing the first post data item and the one or more additional post data items at the second location in an order that is based on whether an author of the first post data item or one or more additional authors of the one or more additional post data items are in a social graph of a viewer associated with the second location.

21. The non-transitory computer readable medium of claim 20, wherein retrieving the one or more additional post data items includes searching a plurality of post data items to identify post data items that are associated with the content identifier.

22. The non-transitory computer readable medium of claim 20, wherein determining the content identifier includes performing a look-up of the reference to the content item to identify a corresponding canonical ID.

23. The non-transitory computer readable medium of claim 20, wherein the reference to the content item is a uniform resource locator (URL) of the content item, and wherein the content identifier is a data string.

24. The non-transitory computer readable medium of claim 20, wherein the content identifier associated with the content item is a URL of the content item.

* * * * *